(12) United States Patent
Shock

(10) Patent No.: US 9,932,220 B1
(45) Date of Patent: *Apr. 3, 2018

(54) MOBILE DISTRIBUTION STATION WITH AISLE WALKWAY

(71) Applicant: Fuel Automation Station, LLC, Birmingham, MI (US)

(72) Inventor: Ricky Dean Shock, Victoria, TX (US)

(73) Assignee: Fuel Automation Station, LLC, Birmingham, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/416,198

(22) Filed: Jan. 26, 2017

Related U.S. Application Data

(63) Continuation of application No. 15/290,371, filed on Oct. 11, 2016, now Pat. No. 9,586,805.

(51) Int. Cl.
| | | |
|---|---|---|
| *B65B 37/00* | (2006.01) | |
| *B67D 7/84* | (2010.01) | |
| *B67D 7/40* | (2010.01) | |
| *B67D 7/62* | (2010.01) | |
| *B67D 7/78* | (2010.01) | |
| *B67D 7/04* | (2010.01) | |
| *B62D 63/08* | (2006.01) | |
| *B60P 3/035* | (2006.01) | |
| *E21B 43/26* | (2006.01) | |

(52) U.S. Cl.
CPC .............. *B67D 7/845* (2013.01); *B60P 3/035* (2013.01); *B62D 63/08* (2013.01); *B67D 7/04* (2013.01); *B67D 7/40* (2013.01); *B67D 7/62* (2013.01); *B67D 7/78* (2013.01); *E21B 43/26* (2013.01)

(58) Field of Classification Search
CPC . B67D 7/38; B67D 7/84; B67D 7/845; B67D 7/3218; B67D 7/36; B60P 3/065
See application file for complete search history.

(56) References Cited

U.S. PATENT DOCUMENTS

| 2,516,150 A | 7/1950 | Samiran |
| 2,769,572 A | 11/1956 | Harman et al. |

(Continued)

FOREIGN PATENT DOCUMENTS

| GB | 2485832 | 5/2012 |
| WO | 0177006 | 10/2001 |

(Continued)

OTHER PUBLICATIONS

Oilfield Business: Technologies. Frac Shack Inc. introduces world's first Bi-Fuel Distribution Unit for hydraulic fracturing industry. Texas Oil & Gas: The National Magazine for Oil & Gas in Texas. vol. 4, Issue 2. 2015. p. 27.

(Continued)

*Primary Examiner* — Jason K Niesz
(74) *Attorney, Agent, or Firm* — Carlson, Gaskey & Olds, P.C.

(57) ABSTRACT

A distribution station includes reels that are arranged on first and second opposed sides in a mobile trailer, with an aisle walkway down the middle of the mobile trailer. The aisle walkway has an aisle width and the mobile trailer has a trailer width, and a ratio of the trailer width to the aisle width is no greater than 5. The reels have a reel diameter, and the aisle width is greater than the reel diameter by a factor of at least 1.3.

19 Claims, 19 Drawing Sheets

(56) References Cited

U.S. PATENT DOCUMENTS

| | | |
|---|---|---|
| 2,777,461 A | 1/1957 | Wildhaber |
| 3,028,010 A | 4/1962 | Headrick |
| 3,136,295 A | 6/1964 | Gramo |
| 3,547,141 A | 12/1970 | Alexander |
| 3,618,643 A | 11/1971 | Thomson |
| 4,139,019 A | 2/1979 | Bresie et al. |
| 4,591,115 A | 5/1986 | DeCarlo |
| 4,930,665 A | 6/1990 | Devine |
| 5,406,988 A | 4/1995 | Hopkins |
| 5,454,408 A | 10/1995 | DiBella et al. |
| 5,503,199 A | 4/1996 | Whitley, II et al. |
| 5,538,051 A | 7/1996 | Brown et al. |
| 5,708,424 A | 1/1998 | Orlando et al. |
| 5,884,675 A | 12/1999 | Krasnov |
| 6,206,056 B1 | 3/2001 | Lagache |
| 6,564,615 B1 | 5/2003 | Carter |
| 6,651,706 B2 | 11/2003 | Litt |
| 6,697,705 B2 | 2/2004 | Johnson et al. |
| 6,755,225 B1 | 6/2004 | Niedwiecki et al. |
| 6,761,194 B1 | 7/2004 | Blong |
| 6,786,245 B1 | 9/2004 | Eichelberger et al. |
| 7,063,276 B2 | 6/2006 | Newton |
| 7,106,026 B2 | 9/2006 | Moore |
| 7,353,808 B2 | 4/2008 | Kakoo |
| 7,415,995 B2 | 8/2008 | Plummer et al. |
| 7,458,543 B2 | 12/2008 | Cutler et al. |
| 7,568,507 B2 | 8/2009 | Farese et al. |
| 7,602,143 B2 | 12/2009 | Capizzo |
| 7,628,182 B2 | 12/2009 | Poulter |
| 7,938,151 B2 | 5/2011 | Hockner |
| 9,346,662 B2 | 5/2016 | Van Vliet et al. |
| 9,371,830 B2 | 6/2016 | Moffitt, Jr. |
| 9,371,831 B2 | 6/2016 | Moffitt, Jr. |
| 9,586,805 B1 * | 3/2017 | Shock ............... B67D 7/40 |
| 2007/0079891 A1 | 4/2007 | Farese et al. |
| 2007/0164031 A1 | 7/2007 | Holz |
| 2007/0181212 A1 | 8/2007 | Fell |
| 2016/0076533 A1 | 3/2016 | Moffitt, Jr. |

FOREIGN PATENT DOCUMENTS

| | | |
|---|---|---|
| WO | 2006005686 | 1/2006 |
| WO | 2008083830 | 7/2008 |
| WO | 2009026607 | 3/2009 |

OTHER PUBLICATIONS

Frac Shack International. Publications & Endorsements. Retrieved Aug. 23, 2016 from: http://www.fracshack.com.

Frac Shack International. Technology. Retrieved Aug. 23, 2016 from: http://www.fracshack.com.

Frac Shack International. Design Benefits. Retrieved Aug. 23, 2016 from: http://www.fracshack.com.

Frac Shack International. Service. Retrieved Aug. 23, 2016 from: http://www.fracshack.com.

Frac Shack International. Frac Shack Series—Series A. Retrieved Aug. 23, 2016 from: http://www.fracshack.com.

Frac Shack International. Frac Shack Series—Series B. Retrieved Aug. 23, 2016 from: http://www.fracshack.com.

Frac Shack International. Frac Shack Series—Series C. Retrieved Aug. 23, 2016 from: http://www.fracshack.com.

Frac Shack International. Frac Shack Series—Series D. Retrieved Aug. 23, 2016 from: http://www.fracshack.com.

Frac Shack International. Frac Shack Series—Series E. Retrieved Aug. 23, 2016 from: http://www.fracshack.com.

Frac Shack International. Frac Shack Series—Series EG. Retrieved Aug. 23, 2016 from: http://www.fracshack.com.

Mann Tek. Dry Disconnect Couplings. Retrieved Jul. 22, 2016 from: http://www.manntek.com/products/drydisconnectcouplings p. 1-4.

Mann Tek. Dry Aviation Couplings. Retrieved Jul. 22, 2016 from: http://www.manntek.com/products/dryaviationcouplings p. 1-4.

Water, J. (2013). Better Safe than Sorry: Frac Shack a welcome addition to the oil patch. Jan. 2, 2013. Retrieved Aug. 23, 2016 from: http://www.pipelinenewsnorth.ca/better-safe-than-sorry-1.1123066.

* cited by examiner

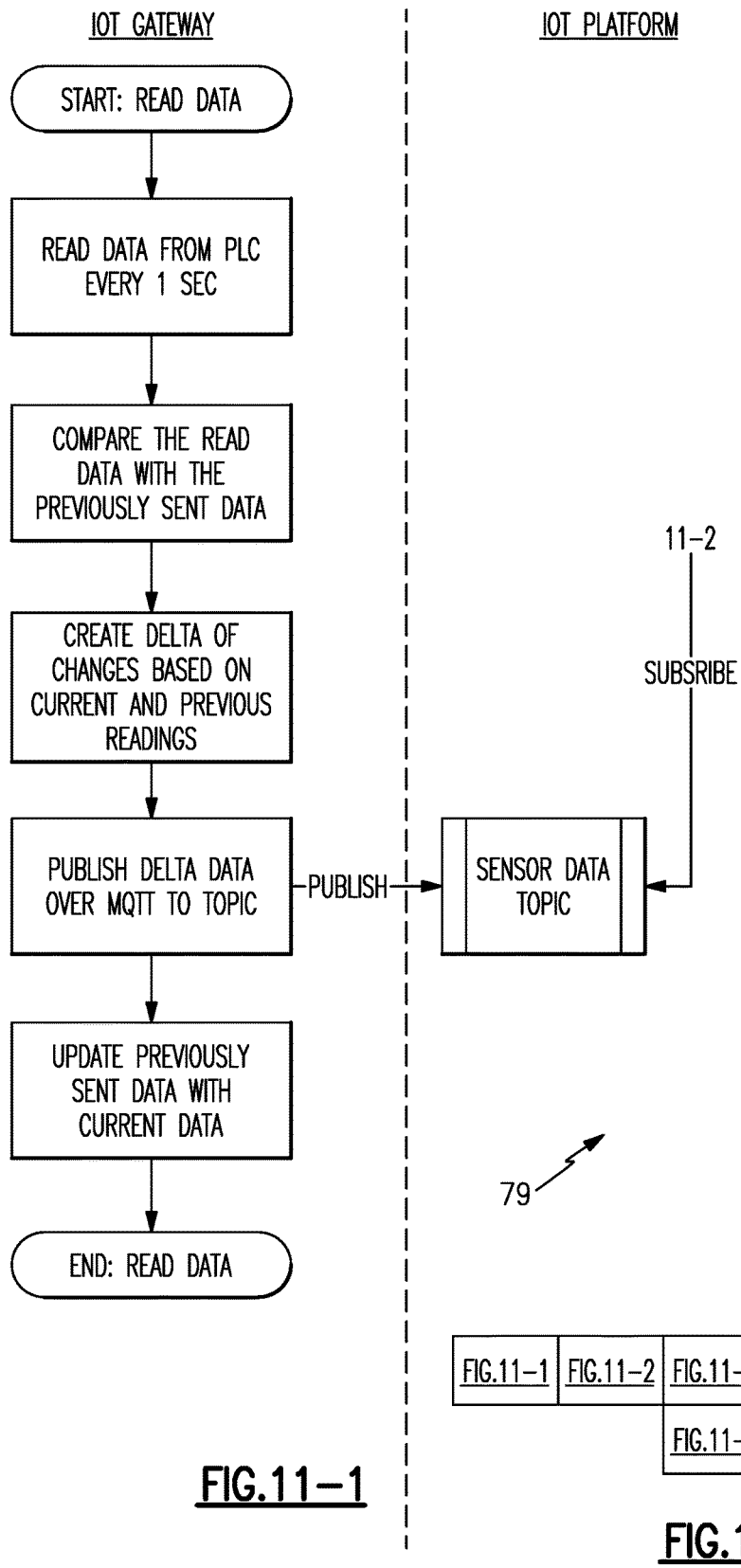

MOBILE DISTRIBUTION STATION WITH AISLE WALKWAY

CROSS-REFERENCE TO RELATED APPLICATION

The present disclosure is a continuation of U.S. patent application Ser. No. 15/290,371, filed Oct. 11, 2016.

BACKGROUND

Hydraulic fracturing (also known as fracking) is a well-stimulation process that utilizes pressurized liquids to fracture rock formations. Pumps and other equipment used for hydraulic fracturing typically operate at the surface of the well site. The equipment may operate semi-continuously, until refueling is needed, at which time the equipment may be shut-down for refueling. Shut-downs are costly and reduce efficiency. More preferably, to avoid shut-downs fuel is replenished in a hot-refueling operation while the equipment continues to run. This permits fracking operations to proceed fully continuously; however, hot-refueling can be difficult to reliably sustain for the duration of the fracking operation.

SUMMARY

A distribution station according to an example of the present disclosure includes a mobile trailer, a pump on the mobile trailer, first and second manifolds on the mobile trailer and fluidly connected with the pump, a plurality of reels on the mobile trailer, and a plurality of hoses connected, respectively, with the reels. A portion of the reels are connected with the first manifold and another portion of the reels are connected with the second manifold. A plurality of valves on the mobile trailer are situated between one of the first or second manifolds and a respective different one of the hoses. A plurality of fluid level sensors are associated with respective different one of the hoses. The reels are arranged on first and second opposed sides in the mobile trailer, with an aisle walkway down the middle of the mobile trailer. The aisle walkway has an aisle width and the mobile trailer has a trailer width, and a ratio of the trailer width to the aisle width is no greater than 5. The reels have a reel diameter, and the aisle width is greater than the reel diameter by a factor of at least 1.3.

In a further embodiment of any of the foregoing embodiments, the reels on each of the first and second opposed sides are arranged in upper and lower rows of reels.

In a further embodiment of any of the foregoing embodiments, a ratio of a number of reels in the upper row to a number of reels in the lower row is 1:1.

A further embodiment of any of the foregoing embodiments include first and second support racks on which the reels are supported. The first support rack is arranged on the first side and the second support rack arranged on the second side.

In a further embodiment of any of the foregoing embodiments, the trailer width is no greater than about 96 inches.

In a further embodiment of any of the foregoing embodiments, the mobile trailer includes trailer end wall that has an outside door, and an inside wall that defines first and second compartments in the mobile trailer. The outside door opens into the first compartment, and at least the manifolds and the reels are in the first compartment.

In a further embodiment of any of the foregoing embodiments, the inside wall includes an inside door providing access between the first compartment and the second compartment. The aisle walkway extends from the outside door to the inside door.

A further embodiment of any of the foregoing embodiments include a controller in the second compartment. The controller configured to operate the valves.

In a further embodiment of any of the foregoing embodiments, the second compartment is insulated with a fire resistant or retardant material.

In a further embodiment of any of the foregoing embodiments, the aisle width is greater than the reel diameter by a factor of at least 1.5.

In a further embodiment of any of the foregoing embodiments, the ratio of the trailer width to the aisle width is greater than 2.

In a further embodiment of any of the foregoing embodiments, the ratio of the trailer width to the aisle width is equal to or less than 4.

A further embodiment of any of the foregoing embodiments include a floor pan in the mobile trailer.

A distribution station according to an example of the present disclosure includes a mobile trailer, a pump on the mobile trailer, at least one manifold on the mobile trailer and fluidly connected with the pump, a plurality of reels on the mobile trailer, and a plurality of hoses connected, respectively, with the reels. The reels are connected with the manifold. A plurality of valves on the mobile trailer are situated between the one manifold and a respective different one of the hoses. A plurality of fluid level sensors are associated with respective different one of the hoses. The mobile trailer includes first and second trailer side walls, and a first group of the hoses are deployable from the first trailer side wall and a second group of the hoses are deployable from the second trailer side wall.

In a further embodiment of any of the foregoing embodiments, the reels are arranged on first and second opposed sides in the mobile trailer such that there is an aisle walkway down the middle of the mobile trailer.

In a further embodiment of any of the foregoing embodiments, the reels on each of the first and second opposed sides are arranged in upper and lower rows of reels.

In a further embodiment of any of the foregoing embodiments, the aisle walkway has an aisle width and the reels have a reel diameter, and the aisle width is greater than the reel diameter by a factor of at least 1.3.

In a further embodiment of any of the foregoing embodiments, the mobile trailer has a trailer width of no greater than about 96 inches.

A further embodiment of any of the foregoing embodiments include a floor pan in the mobile trailer.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
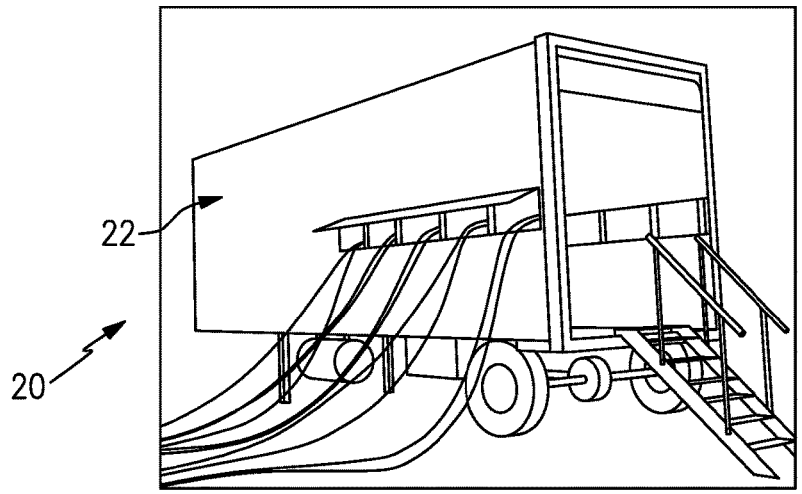
FIG. 1 illustrates an example mobile distribution station.
Figure 2:
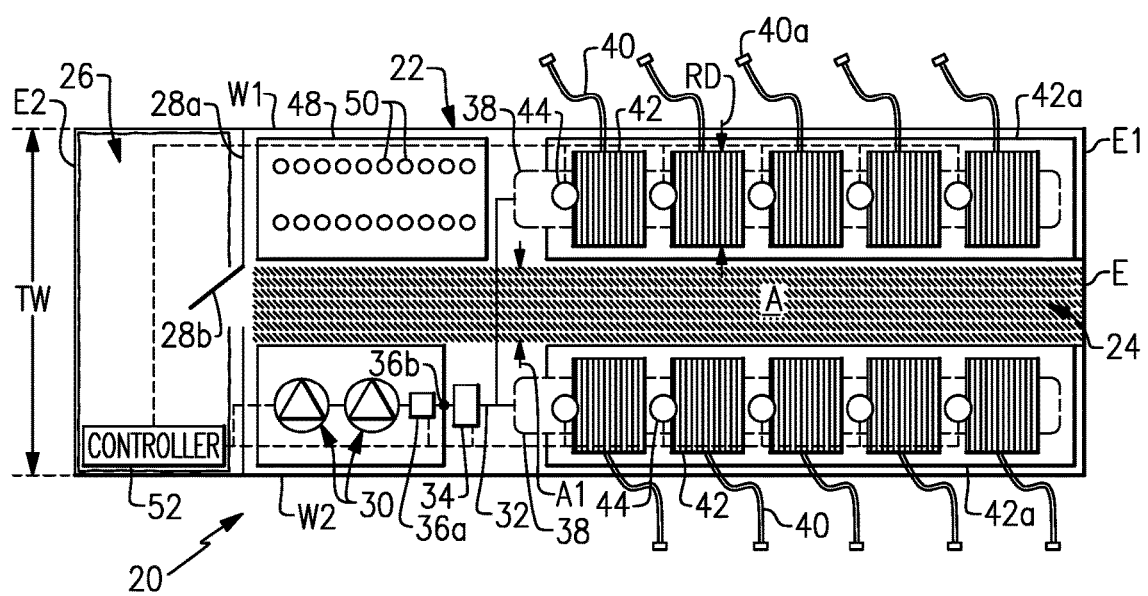
FIG. 2 illustrates an internal layout of a mobile distribution station.

FIG. 1 illustrates a mobile distribution station 20 and FIG. 2 illustrates an internal layout of the station 20. As will be described, the station 20 may serve in a "hot-refueling" capacity to distribute fuel to multiple pieces of equipment while the equipment is running, such as fracking equipment at a well site. As will be appreciated, the station 20 is not limited to applications for fracking or for delivering fuel. The examples herein may be presented with respect to fuel delivery, but the station 20 may be used in mobile delivery of other fluids, in other gas/petroleum recovery operations, or in other operations where mobile refueling or fluid delivery will be of benefit.

In this example, the station 20 includes a mobile trailer 22. Generally, the mobile trailer 22 is elongated and has first and second opposed trailer side walls W1 and W2 that join first and second opposed trailer end walls E1 and E2. Most typically, the trailer 22 will also have a closed top (not shown). The trailer side walls W1/W2 define a trailer width, TW. The mobile trailer 22 may have wheels that permit the mobile trailer 22 to be moved by a vehicle from site to site to service different hot-refueling operations.

In this example, the mobile trailer 22 has two compartments. A first compartment 24 includes the physical components for distributing fuel, such as diesel fuel, and a second compartment 26 serves as an isolated control room for managing and monitoring fuel distribution. The compartments 24/26 are separated by an inside wall 28a that has an inside door 28b. The second compartment 26 may be insulated with a fire resistant or retardant material 26a. In the event of a fire threat, a worker may take cover in the second compartment 26. The fire resistant or retardant material 26a may shield the second compartment and thus temporarily protect the worker under such circumstances. The second compartment 26 may include an auxiliary escape door to provide external egress from the trailer 22. Thus, if needed, a worker may exit the trailer 22 other than by the first compartment 24.

The first compartment 24 includes one or more pumps 30. Fuel may be provided to the one or more pumps 30 from an external fuel source, such as a tanker truck on the site. On the trailer 22, the one or more pumps 30 are fluidly connected via a fuel line 32 with a high precision register 34 for metering fuel. The fuel line 32 may include, but is not limited to, hard piping. In this example, the fuel line 32 includes a filtration and air eliminator system 36a and one or more sensors 36b. Although optional, the system 36a is beneficial in many implementations, to remove foreign particles and air from the fuel prior to delivery to the equipment. The one or more sensors 36b may include a temperature sensor, a pressure sensor, or a combination thereof, which assist in fuel distribution management.

The fuel line 32 is connected with one or more manifolds 38. In the illustrated example, the station 20 includes two manifolds 38 that arranged on opposed sides of the compartment 24. As an example, the manifolds 38 are elongated tubes that are generally larger in diameter than the fuel line 32 and that have at least one inlet and multiple outlets. Each hose 40 is wound, at least initially, on a reel 42 that is rotatable to extend or retract the hose 40 externally through one or more windows of the trailer 22. Each reel 42 has a reel diameter RD, which is the outside diameter or dimension of the reel 42. Most typically, all or substantially all of the reels 42 will be the same size and thus have a common reel diameter RD. Each reel 42 may have an associated motor to mechanically extend and retract the hose 40.

Figure 3:
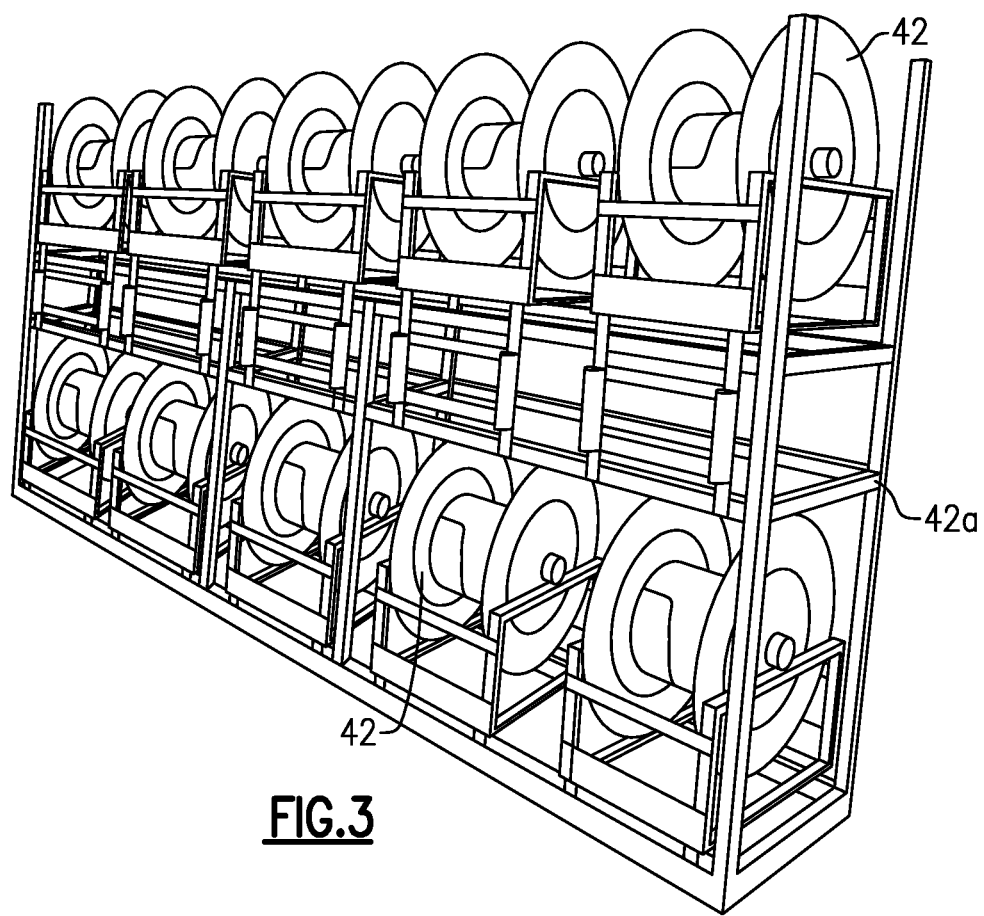
FIG. 3 illustrates an isolated view of hose reels on a support rack used in a mobile distribution station.

As shown in an isolated view in FIG. 3, the reels 42 are mounted on a support rack 42a. In this example, the support rack 42a is configured with upper and lower rows of reels 42. For instance, a ratio of the number of reels 42 in the upper row to a number of reels in the lower row on the support rack 42a is 1:1. As an example, each row has five reels 42 such that each support rack 42a provides ten reels 42 and thus ten hoses 40. There are two support racks 42a (FIG. 2) arranged on opposed sides of the first compartment 24. The reels 42 are thus likewise arranged on opposed sides of the first compartment 24 in the trailer 22. The station 20 therefore can provide twenty hoses 40 in the illustrated arrangement, with ten hoses 40 deployable on each side of the station 20. For instance, the first group of ten hoses 40 on one side of the compartment 24 are deployable from the first trailer side wall W1 and the second group of ten hoses 40 are deployable from the second trailer side wall W2. As will be appreciated, fewer or additional reels and hoses may be used in alternative examples.

An aisle walkway (A) runs down the middle of the trailer 22. In this example, the aisle walkway A runs between the support racks 42a from an outside door E to the inside door 28b. Most typically, the aisle walkway A will include the space or volume through which workers walk to operate the station 20. The aisle walkway A has an aisle width A1. As an example, the aisle width A1 is the largest constant width walkway down the trailer 22 adjacent at least the reels 42 that is not intruded upon by affixed equipment in the trailer 22, such as the reels 42, support racks 42a, other support structures, etc.

The size of the aisle width A can contribute to reducing the potential for undesired incidents. For instance, there may be two or three or more workers that walk up and down the aisle walkway A in connection with their job duties. The workers need space to potentially pass by each other in the aisle walkway A and carry equipment through the aisle walkway A without bumping into each other or into equipment affixed in the trailer 22.

The aisle width A1, however, is not unlimited and is subject to space availability and other factors relating to the performance of the station 20. For instance, the reel diameter RD relates to the lengths of hoses that can be stored on the reels 42. A relatively large reel diameter RD can accommodate a long hose winding, while a relatively smaller reel diameter RD would only accommodate a shorter hose winding. Longer hoses potentially provide greater access to equipment on a site that is located farther from the station, but longer hoses require more space in a station than shorter hoses due to the size of the reel needed to wind the longer hose. There is thus a multi-faceted interplay between the size and number of reels, arrangement of reels, and size/location of an aisle.

In a middle aisle arrangement as with the aisle walkway A, the aisle width A1 is greater than the reel diameter RD by a factor of at least 1.3. In a further example, the aisle width A1 is greater than the reel diameter RD by a factor of at least 1.5, and the trailer width TW is no greater than about 96 inches.

Additionally or alternatively, in a further example, a ratio of the trailer width TW to the aisle width A1 is no greater than 5. In a further example, the ratio of the trailer width TW to the aisle width A1 is also greater than 2. In a further example, the ratio of the trailer width TW to the aisle width A1 is also equal to or less than 4. In a further example, the trailer width TW is no greater than about 96 inches and the ratio of the trailer width TW to the aisle width A1 is greater than 2 and no greater than 5. In a further example of any of the examples herein, the aisle width A1 is between about 30 inches and about 38 inches. The parameters above provide good station performance in combination with good packaging in the trailer 22 and good aisle size for worker movement.

Figure 4:
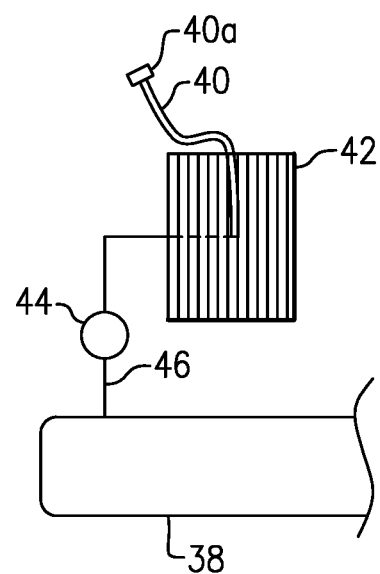
FIG. 4 illustrates an example of a connection between a manifold, a control valve, and a reel.

As shown in a representative example in FIG. 4, each hose 40 is connected to a respective one of the reels 42 and a respective one of a plurality of control valves 44. For example, a secondary fuel line 46 leads from the manifold 38 to the reel 42. The control valve 44 is in the secondary fuel line 46. The control valve 44 is moveable between open and closed positions to selectively permit fuel flow from the manifold 38 to the reel 42 and the hose 40. For example, the control valve 44 is a powered valve, such as a solenoid valve.

In the illustrated example, the first compartment 24 also includes a sensor support rack 48. The sensor support rack 48 holds integrated fuel cap sensors 50 (when not in use), or at least portions thereof. When in use, each integrated fuel cap sensor 50 is temporarily affixed to a piece of equipment (i.e., the fuel tank of the equipment) that is subject to the hot-refueling operation. Each hose 40 may include a connector end 40a and each integrated fuel cap sensor 50 may have a corresponding mating connector to facilitate rapid connection and disconnection of the hose 40 with the integrated fuel cap sensor 50. For example, the connector end 40a and mating connector on the integrated fuel cap sensor 50 form a hydraulic quick-connect.

At least the control valves 44, pump or pumps 30, sensor or sensors 36b, and register 34 are in communication with a controller 52 located in the second compartment 26. As an example, the controller 52 includes software, hardware, or both that is configured to carry out any of the functions described herein. In one further example, the controller 52 includes a programmable logic controller with a touchscreen for user input and display of status data. For example, the screen may simultaneously show multiple fluid levels of the equipment that is being serviced.

When in operation, the integrated fuel cap sensors 50 are mounted on respective fuel tanks of the pieces of equipment that are subject to the hot-refueling operation. The hoses 40 are connected to the respective integrated fuel cap sensors 50. Each integrated fuel cap sensor 50 generates signals that are indicative of the fuel level in the fuel tank of the piece of equipment on which the integrated fuel cap sensor 50 is mounted. The signals are communicated to the controller 52.

The controller 52 interprets the signals and determines the fuel level for each fuel tank of each piece of equipment. In response to a fuel level that falls below a lower threshold, the controller 52 opens the control valve 44 associated with the hose 40 to that fuel tank and activates the pump or pumps 30. The pump or pumps 30 provide fuel flow into the manifolds 38 and through the open control valve 44 and reel 42 such that fuel is provided through the respective hose 40 and integrated fuel cap sensor 50 into the fuel tank. The lower threshold may correspond to an empty fuel level of the fuel tank, but more typically the lower threshold will be a level above the empty level to reduce the potential that the equipment completely runs out of fuel and shuts down. The controller 52 can also be programmed with a failsafe measure related to the operation of the fuel cap sensors 50. As an example, once a control valve 44 is open, if the controller 52 does not detect a change in fuel level from the fuel cap sensor 50 associated with the control valve 44 within a preset time period, the controller 52 shuts the pump 30 off and closes the control valve 44. Thus, if a hose 40 were to rupture, spillage of fuel is limited to the volume of fuel in the hose 40. For instance, the preset time period may be three seconds, six seconds, ten seconds, or fifteen seconds, which may limit spillage to approximately fifteen gallons for a given size of hose.

The controller 52 also determines when the fuel level in the fuel tank reaches an upper threshold. The upper threshold may correspond to a full fuel level of the fuel tank, but more typically the upper threshold will be a level below the full level to reduce the potential for overflow. In response to reaching the upper threshold, the controller 52 closes the respective control valve 44 and ceases the pump or pumps 30. If other control valves 44 are open or are to be opened, the pump or pumps 30 may remain on. The controller 52 can also be programmed with an electronic stop failsafe measure to prevent over-filling. As an example, once an upper threshold is reached on a first tank and the control valve 44 is closed, but the pump 30 is otherwise to remain on to fill other tanks, if the fuel level continues to rise in the first tank, the controller 52 shuts the pump 30 off.

Multiple control valves 44 may be open at one time, to provide fuel to multiple fuel tanks at one time. Alternatively, if there is demand for fuel from two or more fuel tanks, the controller 52 may sequentially open the control valves 44 such that the tanks are refueled sequentially. For instance, upon completion of refueling of one fuel tank, the controller 52 closes the control valve 44 of the hose 40 associated with that tank and then opens the next control valve 44 to begin refueling the next fuel tank. Sequential refueling may facilitate maintaining internal pressure in the manifold and fuel line 32 above a desired or preset pressure threshold to more rapidly deliver fuel. Similarly, the controller 52 may limit the number of control valves 44 that are open at any one instance in order to maintain the internal pressure in the manifold and fuel line 32 above a desired or preset threshold. The controller 52 may perform the functions above while in an automated operating mode. Additionally, the controller 52 may have a manual mode in which a user can control at least some functions through the PLC, such as starting and stopped the pump 30 and opening and closing control valves 44. For example, manual mode may be used at the beginning of a job when initially filling tanks to levels at which the fuel cap sensors 50 can detect fuel and/or during a job if a fuel cap sensor 50 becomes inoperable. Of course, operating in manual mode may deactivate some automated functions, such as filling at the low threshold or stopping at the high threshold.

In addition to the use of the sensor signals to determine fuel level, or even as an alternative to use of the sensor signals, the refueling may be time-based. For instance, the fuel consumption of a given piece of equipment may be known such that the fuel tank reaches the lower threshold at known time intervals. The controller 52 is operable to refuel the fuel tank at the time intervals rather than on the basis of the sensor signals, although sensor signals may also be used to verify fuel level.

The controller 52 also tracks the amount of fuel provided to the fuel tanks. For instance, the register 34 precisely measures the amount of fuel provided from the pump or pumps 30. As an example, the register 34 is an electronic register and has a resolution of about 0.1 gallons. The register 34 communicates measurement data to the controller 52. The controller 52 can thus determine the total amount of fuel used to very precise levels. The controller 52 may also be configured to provide outputs of the total amount of fuel consumed. For instance, a user may program the controller 52 to provide outputs at desired intervals, such as by worker shifts or daily, weekly, or monthly periods. The outputs may also be used to generate invoices for the amount of fuel used. As an example, the controller 52 may provide a daily output of fuel use and trigger the generation of an invoice that corresponds to the daily fuel use, thereby enabling almost instantaneous invoicing.

In a further example, the integrated fuel cap sensors 50 are each hard-wired to the controller 52. The term "hard-wired" or variations thereof refers to a wired connection between two components that serves for electronic communication there between, which here a sensor and a controller. The hard-wiring may facilitate providing more reliable signals from the integrated fuel cap sensors 50. For instance, the many pieces of equipment, vehicles, workers, etc. at a site may communicate using wireless devices. The wireless signals may interfere with each other and, therefore, degrade communication reliability. Hard-wiring the integrated fuel cap sensors 50 to the controller 52 facilitates reduction in interference and thus enhances reliability.

In general, hard-wiring in a hot-refueling environment presents several challenges. For example, a site has many workers walking about and typically is located on rough terrain. Thus, as will be described below, each integrated fuel cap sensor 50 is hard-wired through the associated hose 40 to the controller 52.

Figure 5:
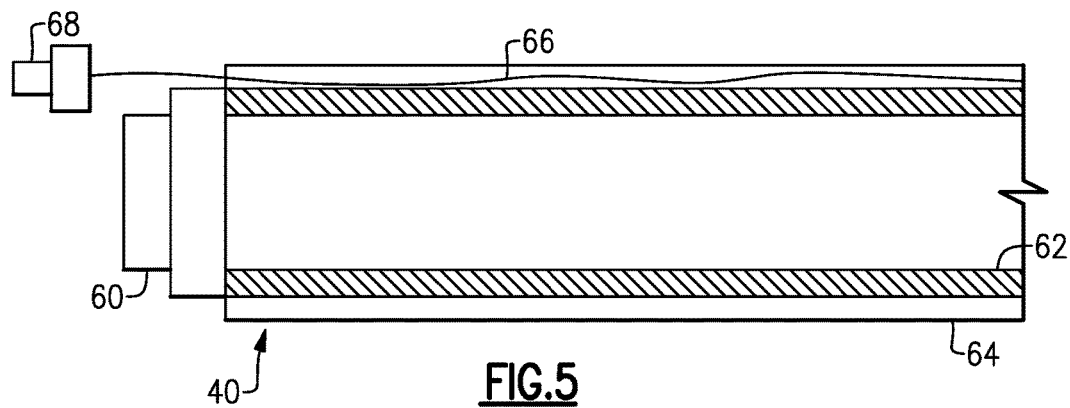
FIG. 5 illustrates a sectioned view of an example hose for a mobile distribution station.

FIG. 5 illustrates a representative portion of one of the hoses 40 and, specifically, the end of the hose 40 that will be located at the fuel tank of the equipment being refueled. In this example, the hose 40 includes a connector 60 at the end for detachably connecting the hose 40 to the integrated fuel cap sensors 50. The hose 40 is formed of a tube 62 and a sleeve 64 that circumscribes the tube 62. As an example, the tube 62 may be a flexible elastomeric tube and the sleeve 64 may be a flexible fabric sleeve. The sleeve 64 is generally loosely arranged around the tube 62, although the sleeve 64 may closely fit on the tube 62 to prevent substantial slipping of the sleeve 64 relative to the tube 62 during use and handling. Optionally, to further prevent slipping and/or to secure the sleeve 64, bands may be tightened around the hose 40. As an example, one or more steel or stainless steel bands can be provided at least near the ends of the hose 40.

A plurality of sensor communication lines 66 (one shown) are routed with or in the respective hoses 40. For instance, each line 66 may include a wire, a wire bundle, and/or multiple wires or wire bundles. In one further example, the line 66 is a low milli-amp intrinsic safety wiring, which serves as a protection feature for reducing the concern for operating electrical equipment in the presence of fuel by limiting the amount of thermal and electrical energy available for ignition. In this example, the line 66 is routed through the hose 40 between (radially) the tube 62 and the sleeve 64. The sleeve 64 thus serves to secure and protect the line 66, and the sleeve 64 may limit spill and spewing if there is a hose 40 rupture. In particular, since the line 66 is secured in the hose 40, the line 66 does not present a tripping concern for workers. Moreover, in rough terrain environments where there are stones, sand, and other objects that could damage the line 66 if it were free, the sleeve 64 shields the line 66 from direct contact with such objects. In further examples, the line 66 may be embedded or partially embedded in the tube 62 or the sleeve 64.

Figure 6:
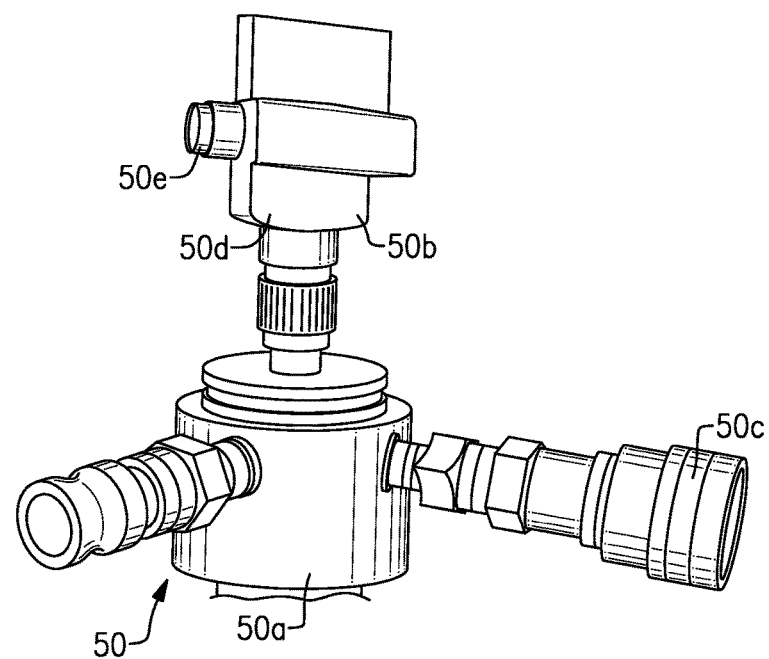
FIG. 6 illustrates an example of an integrated fuel cap sensor for a mobile distribution station.

In this example, the line 66 extends out from the end of the hose 40 and includes a connector 68 that is detachably connectable with a respective one of the integrated fuel cap sensors 50. For example, FIG. 6 illustrates a representative example of one of the integrated fuel cap sensors 50. The integrated fuel cap sensor 50 includes a cap portion 50*a* and a fluid level sensor portion 50*b*. The cap portion 50*a* is detachably connectable with a port of a fuel tank. The cap portion 50*a* includes a connector port 50*c*, which is detachably connectable with the connector 60 of the hose 40. The sensor portion 50*b* includes a sensor 50*d* and a sensor port 50*e* that is detachably connectable with the connector 68 of the line 66. The fuel cap sensor 50 may also include a vent port that attaches to a drain hose, to drain any overflow into a containment bucket and/or reduce air pressure build-up in a fuel tank. Thus, a user may first mount the cap portion 50*a* on the fuel tank of the equipment, followed by connecting the hose 40 to the port 50*c* and connecting the line 66 to the port 50*e*.

The sensor 50*d* may be any type of sensor that is capable of detecting fluid or fuel level in a tank. In one example, the sensor 50*d* is a guided wave radar sensor. A guided wave radar sensor may include a transmitter/sensor that emits radar waves, most typically radio frequency waves, down a probe. A sheath may be provided around the probe. For example, the sheath may be a metal alloy (e.g., stainless steel or aluminum) or polymer tube that surrounds the probe. One or more bushings may be provided between the probe and the sheth, to separate the probe from the sheath. The sheath shields the probe from contact by external objects, the walls of a fuel tank, or other components in a fuel tank, which might otherwise increase the potential for faulty sensor readings. The probe serves as a guide for the radar waves. The radar waves reflect off of the surface of the fuel and the reflected radar waves are received into the transmitter/sensor. A sensor controller determines the "time of flight" of the radar waves, i.e., how long it takes from emission of the radar waves for the radar waves to reflect back to the transmitter/sensor. Based on the time, the sensor controller, or the controller 52 if the sensor controller does not have the capability, determines the distance that the radar waves travel. A longer distance thus indicates a lower fuel level (farther away) and a shorter distance indicates a higher fuel level (closer).

Figure 7:
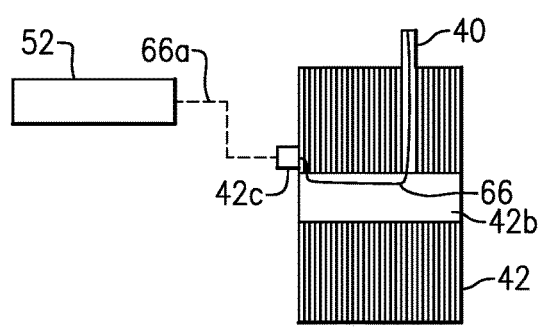
FIG. 7 illustrates an example of the routing of a sensor communication line through a reel in a mobile distribution station.

The line 66 routes through the hose 40 and back to the reel 42 in the trailer 22. For example, the line 66 is also routed or hard-wired through the reel 42 to the controller 52. FIG. 7 illustrates a representative example of the routing in the reel 42. In this example, the reel 42 includes a spindle 42*b* about which the reel is rotatable. The spindle 42*b* may be hollow, and the line 66 may be routed through the spindle 42*b*. The reel 42 may also include a connector 42*c* mounted thereon. The connector 42*c* receives the line 66 and serves as a port for connection with another line 66*a* to the controller 52.

The lines 66a may converge to one or more communication junction blocks or "bricks" prior to the controller 52. The communication junction blocks may serve to facilitate the relay of the signals back to the controller 52. The communication junction blocks may alternatively or additionally serve to facilitate identification of the lines 66, and thus the signals, with respect to which of the hoses a particular line 66 is associated with. For instance, a group of communication junction blocks may have unique identifiers and the lines 66 into a particular communication junction block may be associated with identifiers. A signal relayed into the controller 52 may thus be associated with the identifier of the communication junction blocks and a particular line 66 of that communication junction block in order to identify which hose the signal is to be associated with. The valves 44 may also communicate with the controller 52 in a similar manner through the communication junction blocks.

Figure 8:
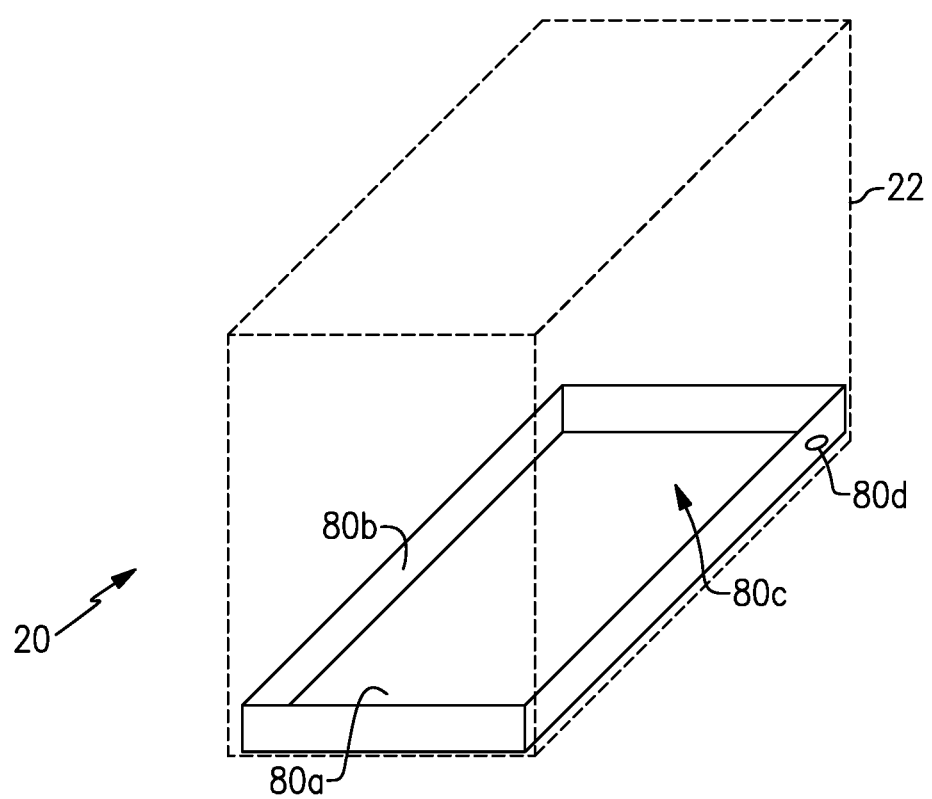
FIG. 8 illustrates an example of a mobile distribution station with an integrated floor pan.

As illustrated in a further example in FIG. 8, the station 20 may be further enhanced to reduce the potential for fluid or fuel escape. The trailer 22, depicted here in phantom, includes a floor pan 80. The floor pan 80 may be formed of metal, polymer, or combinations thereof and serves to reduce or prevent the escape of fluid or fuel from inside the trailer 22. In comparison to a temporary, moveable catch basin, the floor pan 80 is a permanent fixture in the trailer 22, and may be structurally affixed in the trailer 22 by fasteners, adhesive, or the like.

As an example, the floor pan 80 includes a bottom 80a that joins sides 80b to define a container cavity 80c. For instance, the floor pan 80 lines the bottom portion of the trailer 22. The bottom 80a and sides 80b seal the container cavity 80c such that any fluid or fuel that leaks in the trailer 22 is caught and contained in the floor pan 80, to reduce the potential of spilling or leaking out from the trailer 22. The floor pan 80 may line only the first compartment 24 or may line both the first and second compartments 24/26. In alternative examples, the floor pan 80 may line only a portion of the trailer 22 where there is potential for leak or spill. Most typically, the floor pan 80 will cover a majority of the floor area of the trailer 22 or at least a majority of the first compartment 24. In further examples, a ratio of the width of the floor pan 80 to the minimum height of the sides 80b is no less than 16 and may be up to about 50. In yet a further example, the cavity 80c of the floor pan 80 has a volume of approximately two-hundred gallons and the minimum height of the sides 80b is no less than two inches.

Optionally, the floor pan 80 may include one or more drain ports in the bottom 80a, sides 80b, or both, to permit controlled drainage of spilled fluid or fuel from the floor pan 80 into a catch container.

As can be appreciated from the examples herein, the station 20 permits continuous hot-refueling with enhanced reliability. While there might generally be a tendency to choose wireless sensor communication for convenience, a hard-wired approach mitigates the potential for signal interference that can arise with wireless. Moreover, by hard-wiring the sensors through the hoses to the controller, wired communication lines are protected from exposure and do not pose additional concerns for workers on a site. Additionally, the spatial layout of the station 20 permits enhanced station performance in combination with good packaging and aisle size for worker movement.

Figure 9:
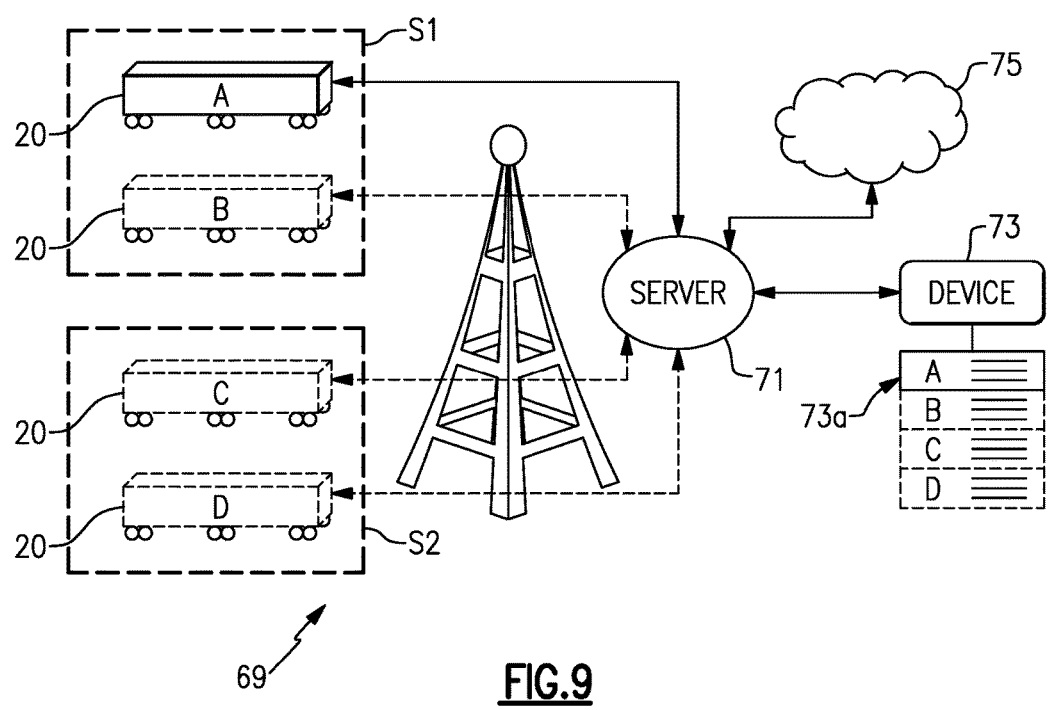
FIG. 9 illustrates a system that can be used to remotely monitor and manage one or more mobile distribution stations.

FIG. 9 illustrates a system 69 for remotely monitoring and/or managing at least one mobile distribution station 20 (A). It is to be appreciated that the system 69 may include additional mobile distribution stations, shown in phantom at 20 (B), 20 (C), and 20 (D) (collectively mobile distribution stations 20), for example. The mobile distribution stations 20 may be located at a single work site or located across several different work sites S1 and S2. Each mobile distribution station 20 is in communication with one or more servers 71 that are remotely located from the mobile distribution stations 20 and work sites S1/S2. In most implementations, the communication will be wireless.

The server 71 may include hardware, software, or both that is configured to perform the functions described herein. The server 71 may also be in communication with one or more electronic devices 73. The electronic device 73 is external of or remote from the mobile fuel distribution stations 20. For example, the electronic device 73 may be, but is not limited to, a computer, such as a desktop or laptop computer, a cellular device, or tablet device. The electronic device 73 may communicate and interact in the system 69 via data connectivity, which may involve internet connectivity, cellular connectivity, software, mobile application, or combinations of these.

The electronic device 73 may include a display 73a, such as an electronic screen, that is configured to display the fuel operating parameter data of each of the mobile distribution stations 20. As an example, the electronic device 73 may display in real-time the operating parameter data of each of the mobile distribution stations 20 in the system 69 to permit remote monitoring and management control of the mobile distribution stations 20. For instance, the operating parameter data may include fuel temperature, fuel pressure, fuel flow, total amount of fuel distributed, operational settings (e.g., low and high fuel level thresholds), or other parameters.

The server 71 may also be in communication with one or more cloud-based devices 75. The cloud-based device 75 may include one or more servers and a memory for communicating with and storing information from the server 71.

The server 71 is configured to communicate with the mobile distribution stations 20. Most typically, the server 71 will communicate with the controller 52 of the mobile distribution station 20. In this regard, the controller 52 of each mobile distribution station 20 may be include hardware, software, or both that is configured for external communication with the server 71. For example, each controller 52 may communicate and interact in the system 69 via data connectivity, which may involve internet connectivity, cellular connectivity, software, mobile application, or combinations of these.

The server 71 is configured to receive operating parameter data from the mobile distribution stations 20. The operating parameter data may include or represent physical measurements of operating conditions of the mobile distribution station 20, status information of the mobile distribution station 20, setting information of the mobile distribution station 20, or other information associated with control or management of the operation of the mobile distribution station 20.

For example, the server 71 utilizes the information to monitor and auto-manage the mobile distribution station 20. The monitoring and auto-management may be for purposes of identifying potential risk conditions that may require shutdown or alert, purposes of intelligently enhancing operation, or purposes of reading fuel or fluid levels in real-time via the sensors 50. As an example, the server 71 may utilize the information to monitor or display fuel or fluid levels, or determine whether the fuel operating parameter data is within a preset limit and send a control action in response to the operating parameter data being outside the preset limit. As will described in further detail below, the control action may be a shutdown instruction to the mobile fuel distribution stations 20, an adjustment instruction to the mobile fuel distribution stations 20, or an alert to the electronic device 73.

Figures 1, 10:
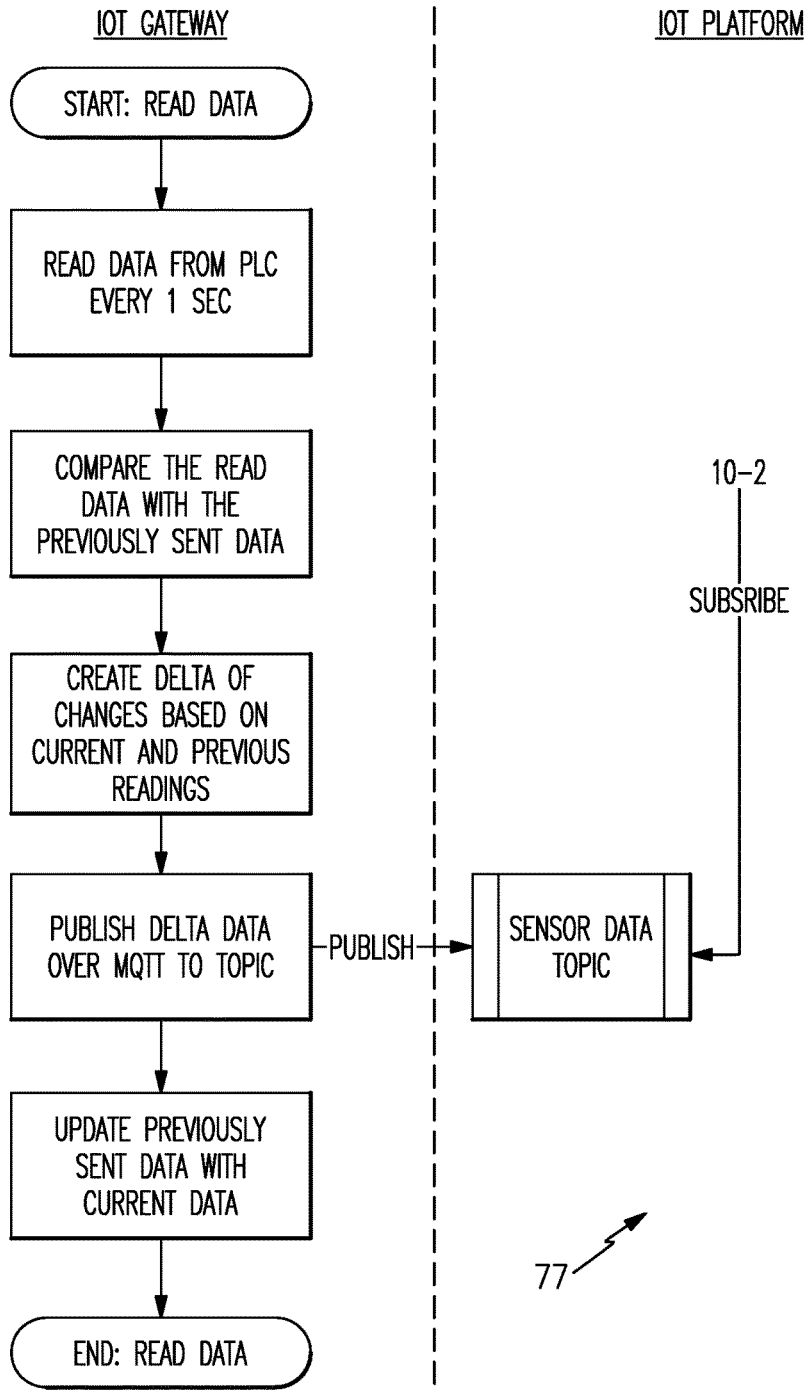
FIG. 10 illustrates a workflow logic diagram that represents an example of a method for managing one or more mobile distribution stations.
Figures 2, 10:
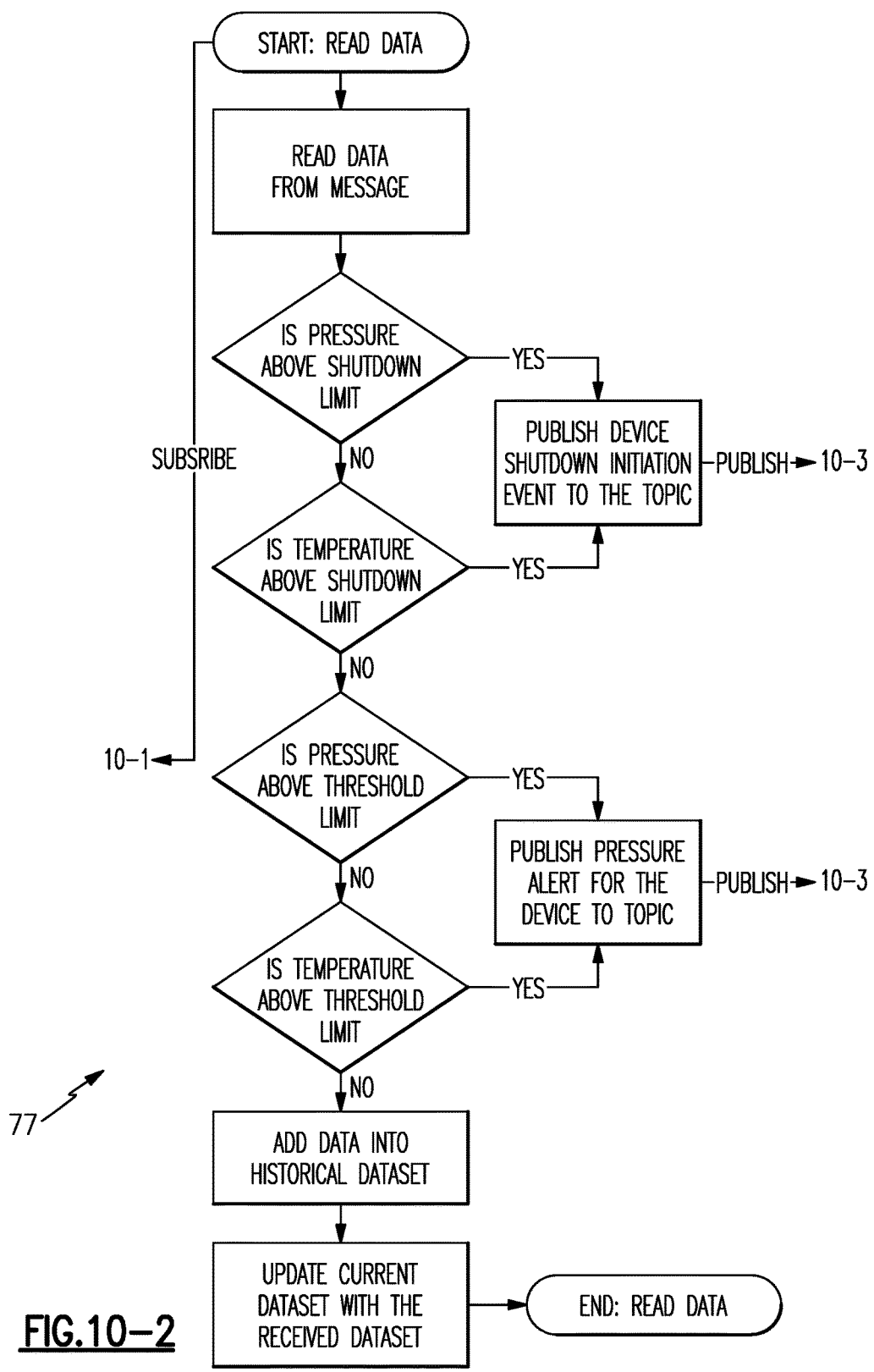
Figures 3, 10:
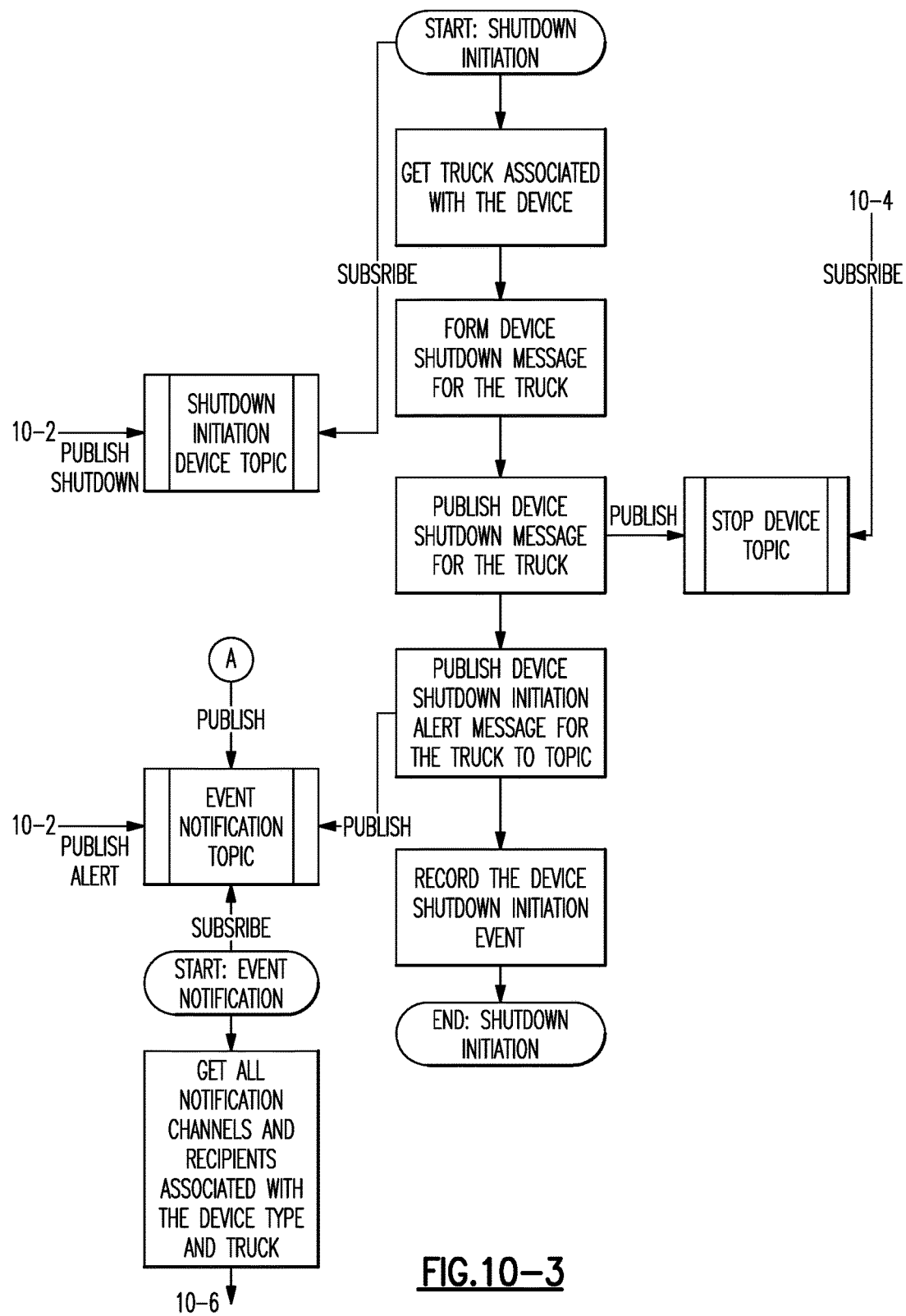
Figures 4, 10:
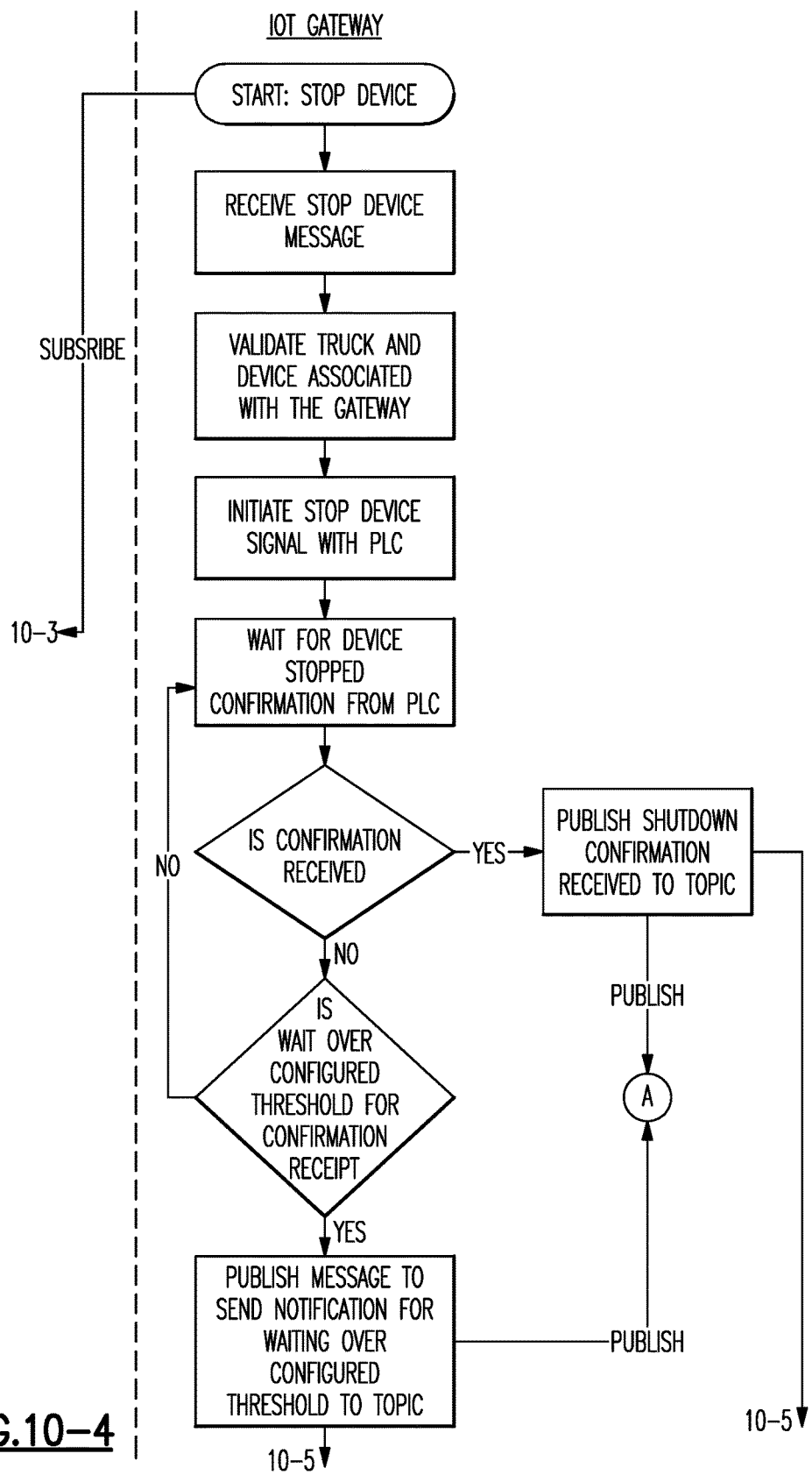
Figures 5, 10:
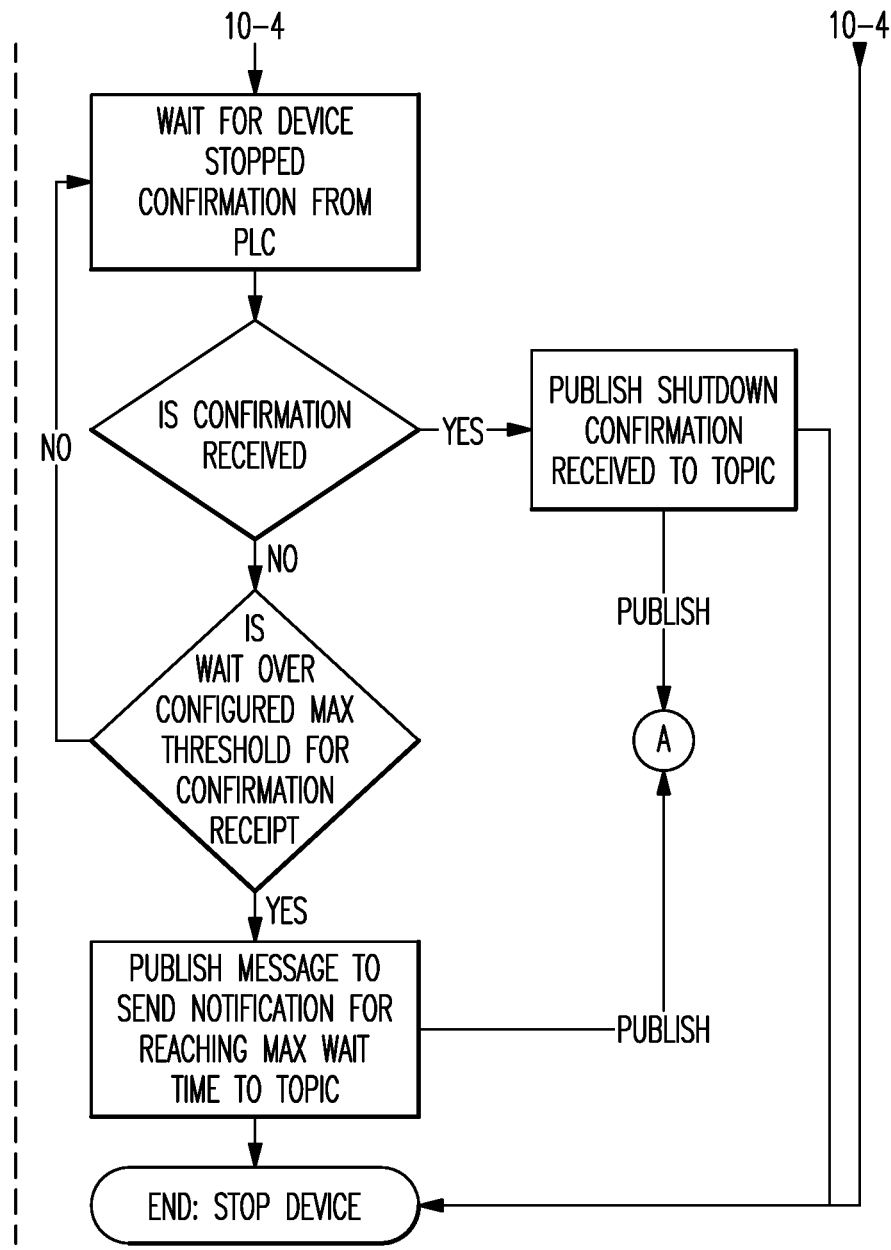
Figures 6, 10:
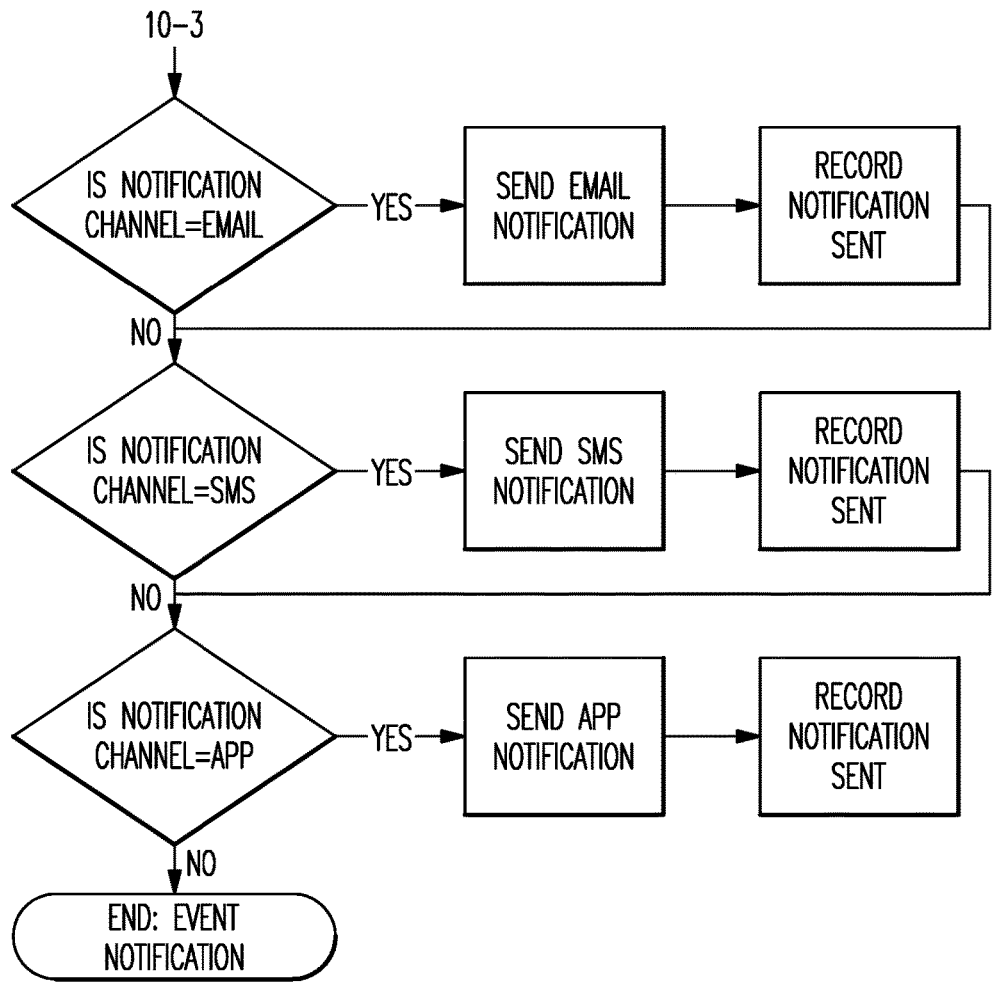

FIG. 10 illustrates a workflow logic diagram of an example control method 77 which can be implemented with the system 69 or with other configurations of one or more mobile distribution stations 20 and one or more servers. In general, the illustrated method 77 can be used to provide a shutdown instruction or an alert if operating parameter data of one or more mobile distribution stations 20 is outside of a preset limit. For instance, if fuel pressure or fuel temperature in one of the mobile distribution stations 20 exceeds one or more limits, the method 77 shuts down the mobile distribution station 20 and/or sends an alert so that appropriate action can, if needed, be taken in response to the situation. In particular, in hot-refueling implementations, the ability to automatically shut down or to provide a remote alert may facilitate enhancement of reliable and safe operation.

Referring to FIG. 10, one or more current or instantaneous operating parameters are read (i.e., by the controller 52). An operating parameter may include, but is not limited to, fuel temperature and fuel pressure. Other parameters may additionally or alternatively be used, such as pump speed or power and fuel flow. Parameters may be first order parameters based on first order readings from sensor signals, or second order parameters that are derived or calculated from first order parameters or first order sensor signals. For instance, temperature is a first order parameter and direct detection of temperature to produce signals representative of temperature constitute first order sensor signals. The product of temperature and pressure, for example, is a second order parameter that is based on first order sensor signals of each of temperature and pressure. As will be appreciated, there may be additional types of second order parameters based on temperature, pressure, power, flow, etc., which may or may not be weighted in a calculation of a second order parameter.

In this example, the current operating parameter is compared with a prior operating parameter stored in memory in the controller 52. A difference in the current operating parameter and the prior operating parameter is calculated to produce a change (delta) value in the operating parameter. The change value is used as the operating parameter data for control purposes in the method 77. The operating parameter data thus represents the change in the operating parameter from the prior reading to the current reading. Use of the change value as the operating parameter data serves to reduce the amount of data that is to be sent in connection with the method 77. For example, the actual operating parameter values may be larger than the change values and may thus require more memory and bandwidth to send than the change values. The change values are sampled and calculated at a predesignated interval rate. In this example, the interval rate is once per second. Each operating parameter is stored in memory for use as the next "prior" operating parameter for comparison with a subsequent "new" operating parameter reading. The controller 52 may be programmed to perform the above steps. As will be appreciated, the steps above achieve data efficiency, and actual values could alternatively or additionally be used if memory and bandwidth permit.

Each operating parameter data reading (i.e., change value) is published or sent via IoT (Internet of Things) Gateway to an IoT Platform, which may be implemented fully or partially on the server 71 and cloud device 75. The operating parameter data may also contain additional information, such as but not limited to, metadata with time stamp information and identification of the individual mobile distribution station 20. In this example, the operating parameter data of interest is associated with fuel pressure and fuel temperature. In the method 77, the operating parameter data for fuel temperature and fuel pressure are compared to, respectively, a preset fuel temperature shutdown limit and a preset fuel pressure shutdown limit. The shutdown limits may be temperature and pressure limits corresponding to rated limits of the pump 30, fuel line 32, and manifold 38, for example.

If the temperature or pressure are outside of the preset fuel temperature or pressure shutdown limits, the method 77 initiates a shutdown event. In this example, the shutdown event includes identifying the particular mobile distribution station 20 associated with the temperature or pressure that is outside of the preset limit, forming a shutdown instruction message, and publishing or sending the shutdown instruction message via the IoT Gateway to the corresponding identified mobile distribution station 20.

Upon receiving the shutdown instruction message, the controller 52 of the identified mobile distribution station 20 validates and executes the shutdown instruction. For instance, shutdown may include shutting off the pump 30 and closing all of the control valves 44. In this example, the method 77 includes a timing feature that waits for confirmation of shutdown. Confirmation may be generated by the controller 52 performing an electronic check of whether the pump 30 is off and the control valves 44 are closed. Confirmation may additionally or alternatively involve manual feedback via input into the controller 52 by a worker at the identified mobile distribution station 20.

Once shutdown is confirmed by the controller 52, confirmation of shutdown is published or sent via the Iot Gateway to the IoT Platform for subsequent issuance of an alert. If there is no confirmation of shutdown by a maximum preset time threshold, a non-confirmation of shutdown is published or sent for subsequent issuance of an alert.

If the temperature and/or pressure is not outside of the preset fuel temperature or pressure shutdown limits, the method 77 in this example continues to determine whether the fuel temperature and fuel pressure with are, respectively, outside of a preset fuel temperature threshold limit and a preset fuel pressure threshold limit. The threshold limits will typically be preset at levels which indicate a potential for shutdown conditions. For example, the threshold limits may be intermediate temperature or pressure levels which, if exceeded, may indicate an upward trend in temperature or pressure toward the shutdown limits. In one example, the threshold limits are rate of change thresholds. For instance, a change value in temperature and/or pressure that exceeds a corresponding threshold change limit may be indicative that temperature and/or pressure is rapidly elevating toward the shutdown condition.

In response to the temperature and/or pressure being outside of the preset fuel temperature or pressure threshold limits, the method 77 initiates an alert event. In this example, the alert event includes initiating an event notification. In the event notification, the method 77 conducts a lookup of notification channels and then issues an alert via one or more selected notification channels, such as an alert on the display 73*a*. As an example, the notification channels may be selected by user preferences and may include alerts by email, SMS (short message service), and/or mobile device app notification (e.g., banners, badges, home screen alerts, etc.). The event notification is also used for alerts of confirmation and non-confirmation of shutdown. The method 77 thus provides capability to nearly instantaneously issue an alert that can be immediately and readily viewed in real-time on the electronic device 73 so that appropriate action, if needed, can be taken. In one example, such actions may include adjustment of operation settings of the mobile distribution station 20, which may be communicated and implemented via the system 69 from the electronic device 73 to the mobile distribution station 20.

Figures 2, 11:
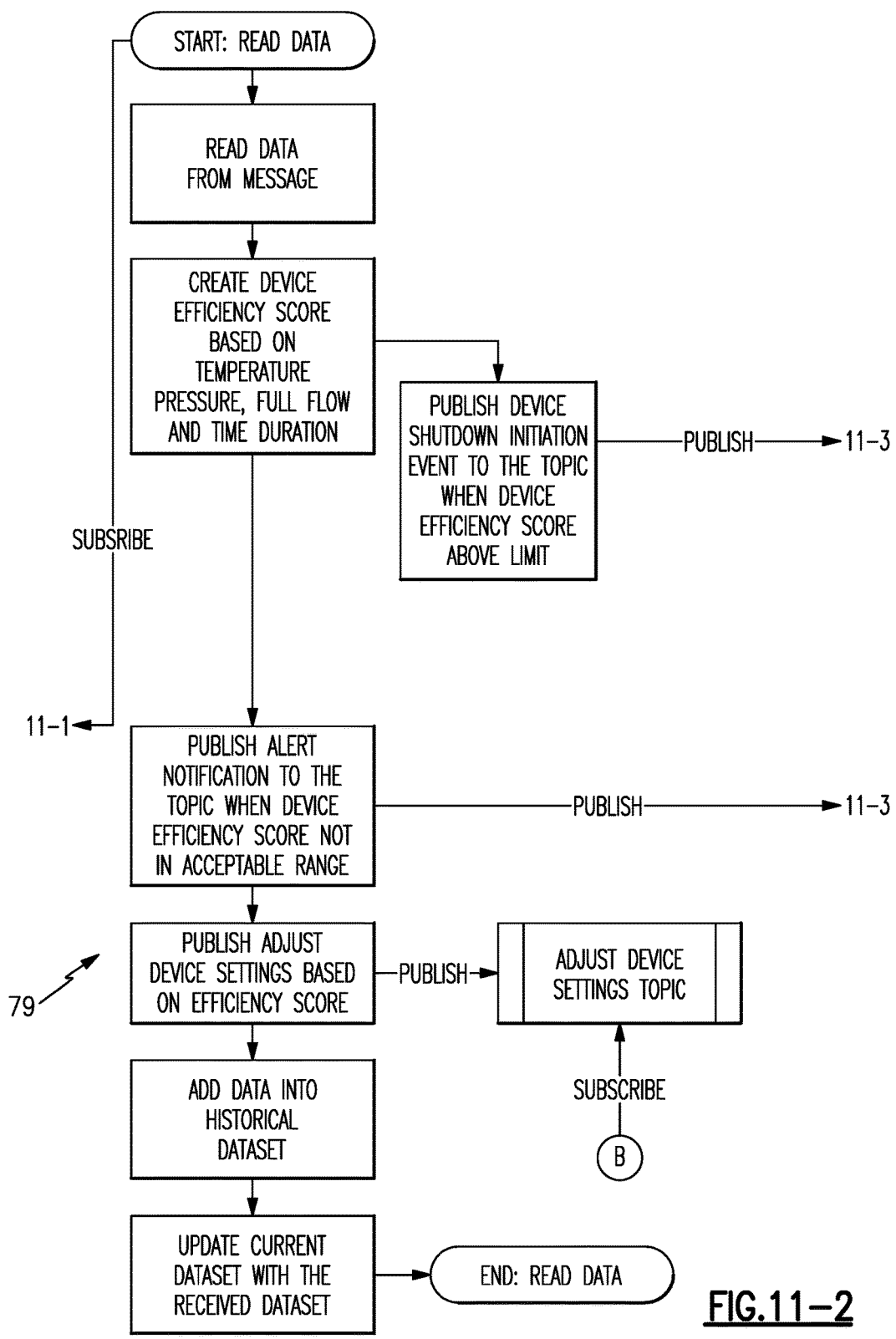
FIG. 11 illustrates another workflow logic diagram that represents an example of a method for managing one or more mobile distribution stations.
Figures 3, 11:
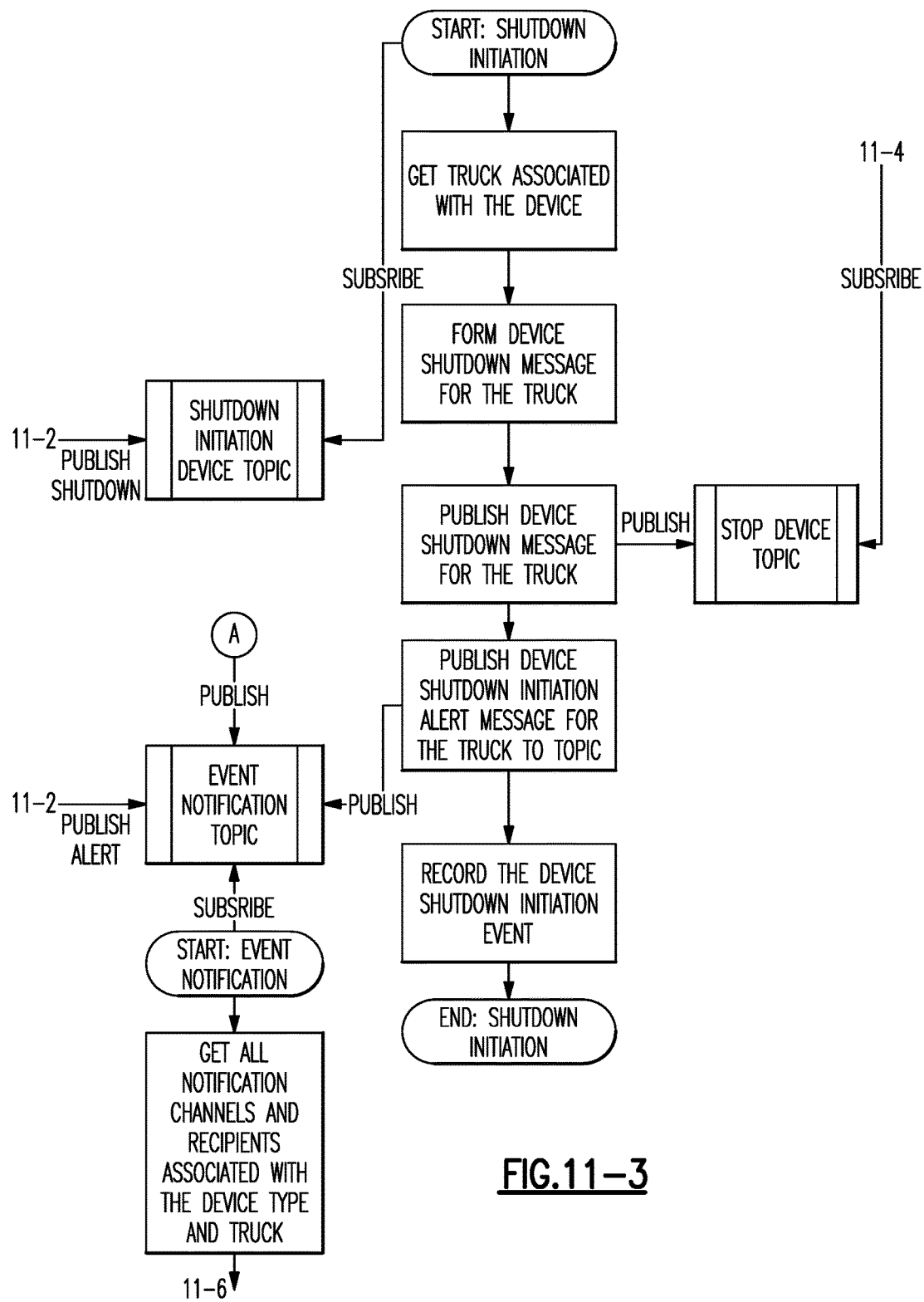
Figures 4, 11:
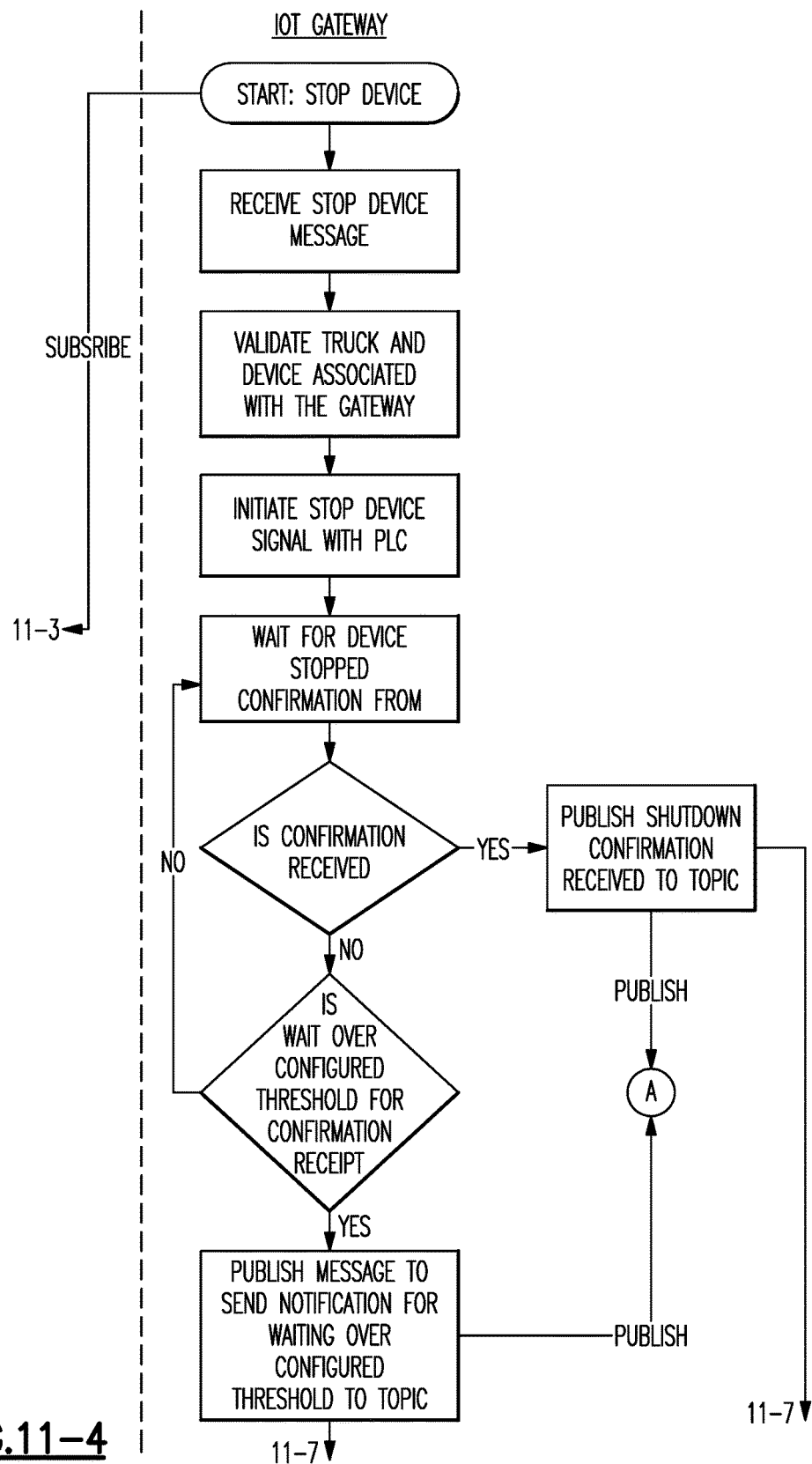
Figures 5, 11:
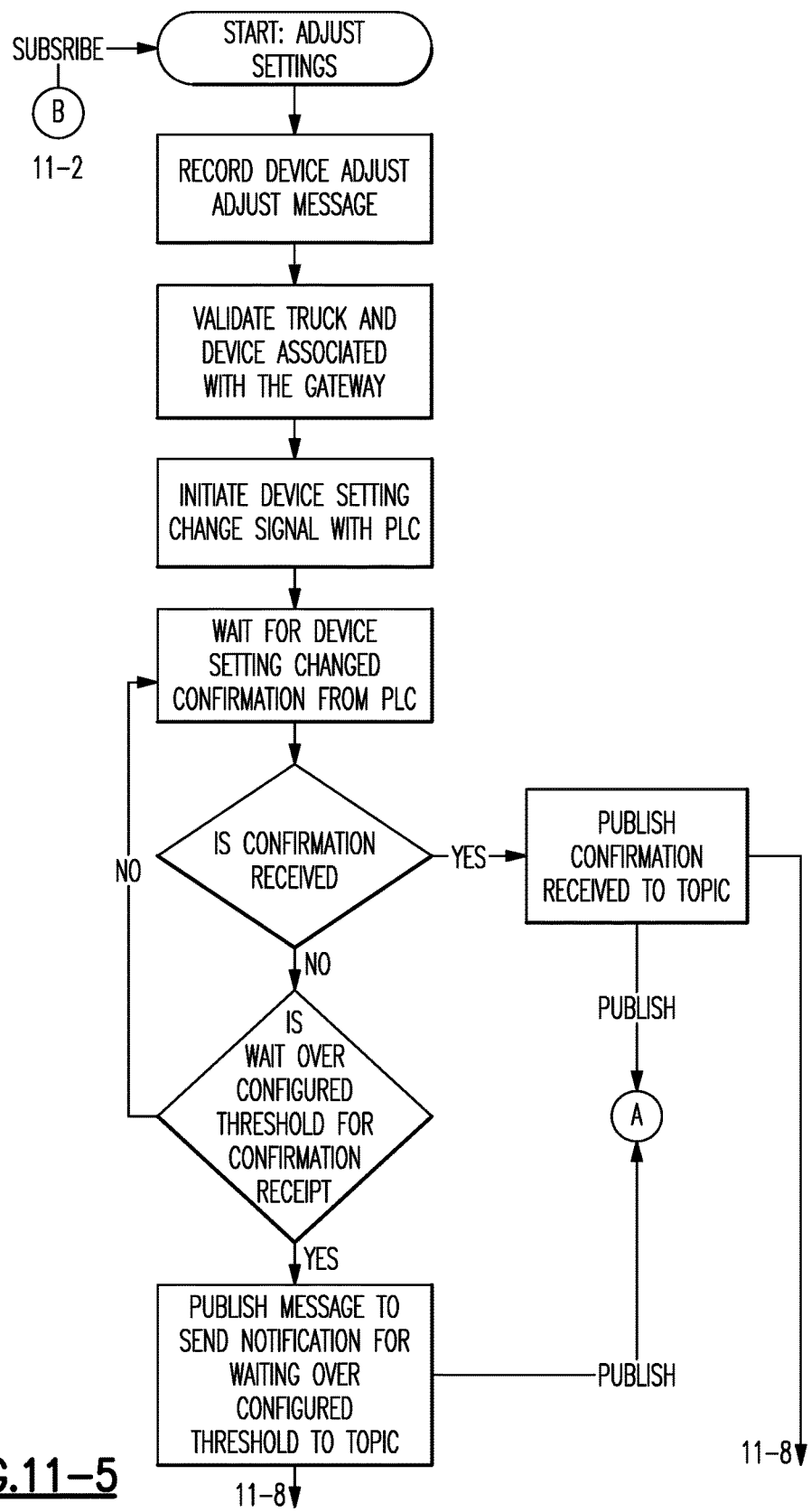
Figures 6, 11:
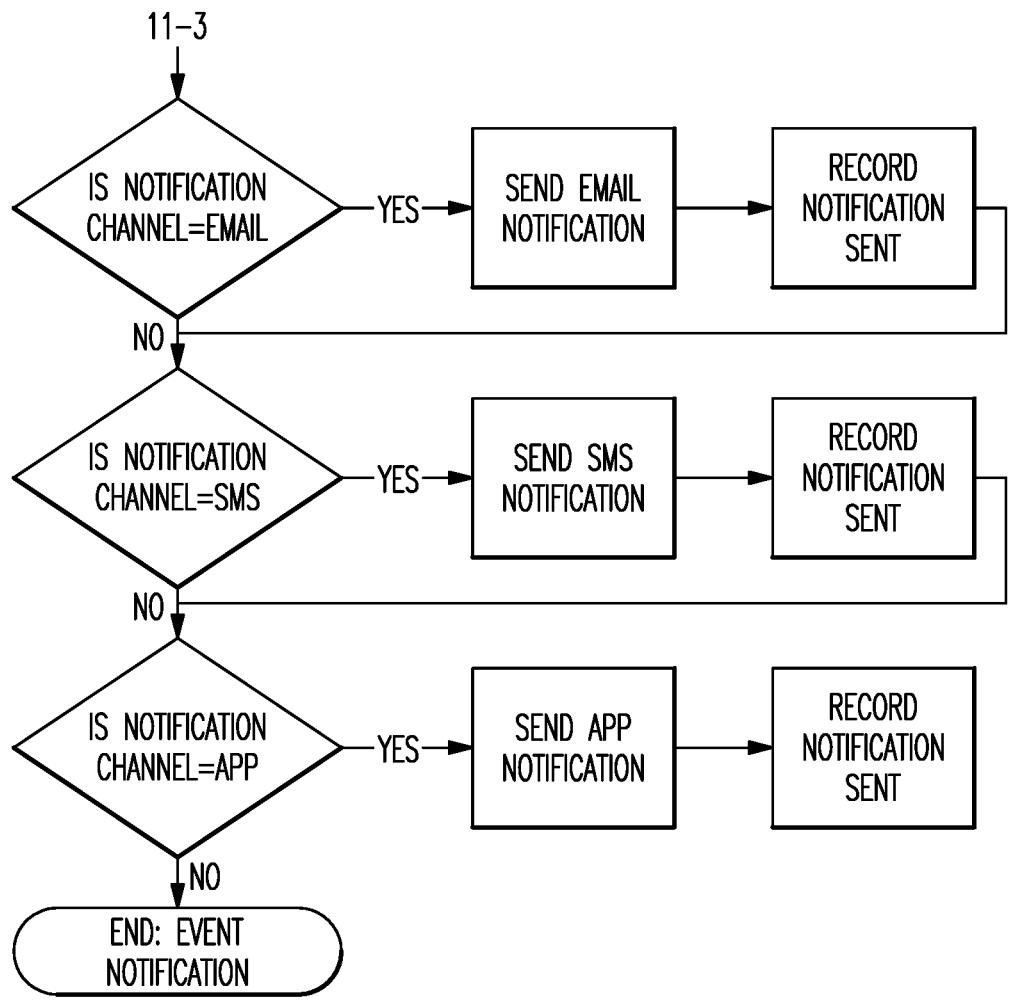
Figures 7, 11:
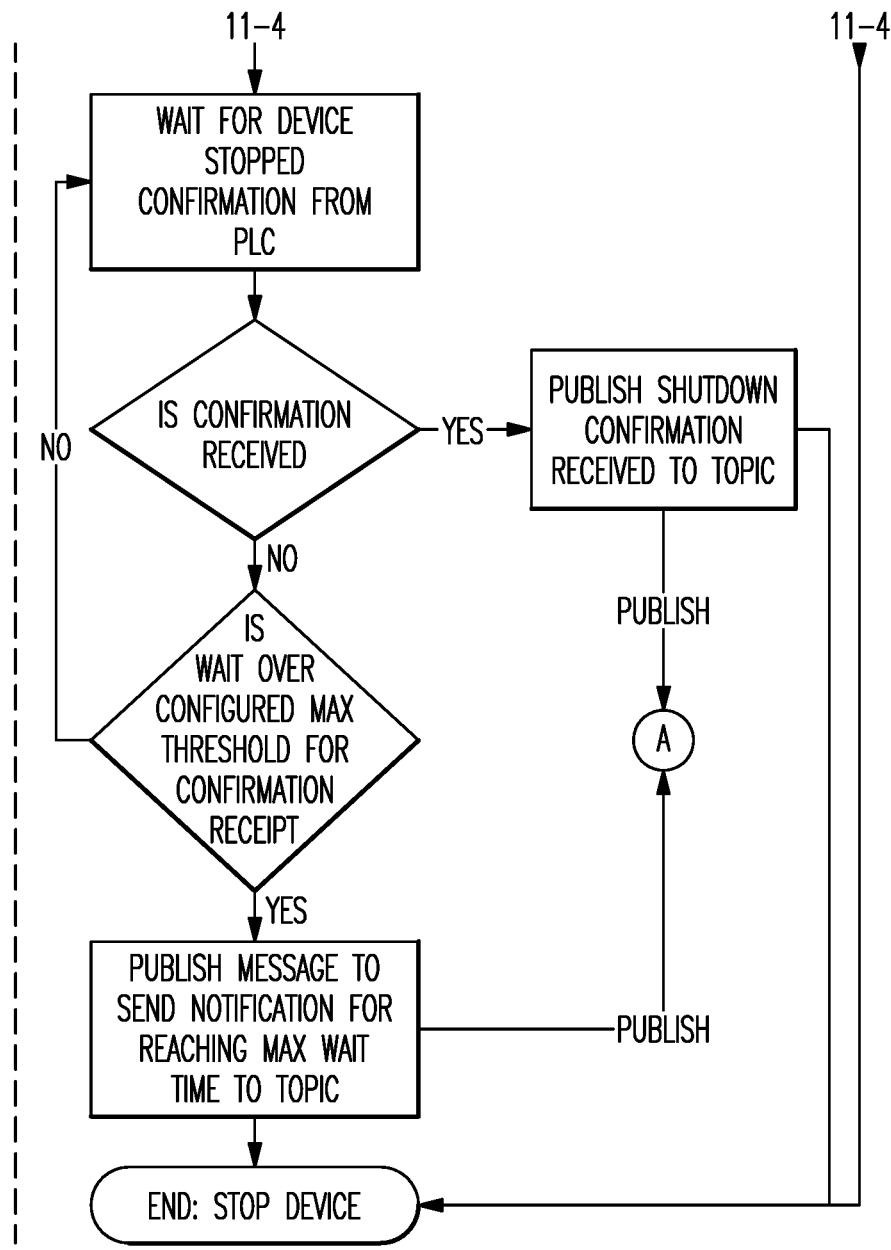
Figures 8, 11:
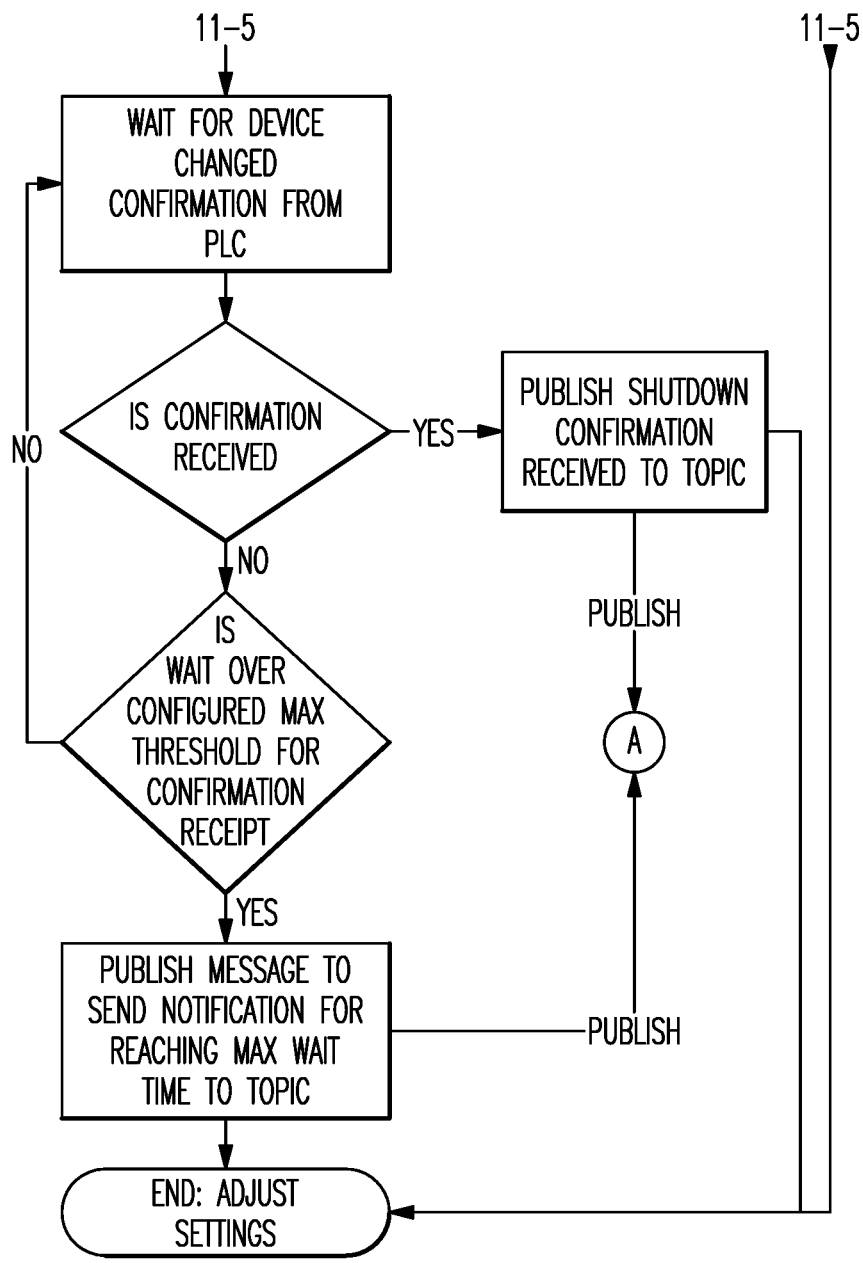

FIG. 11 illustrates a workflow logic diagram of an example control management method 79 which can be implemented with the method 77 and with the system 69 or with other configurations of one or more mobile distribution stations 20 and one or more servers. For example, the method 79 is used to identify shutdown conditions and/or remotely intelligently auto-manage operation of one or more mobile distribution stations 20. The initial portion of the method 79 with respect to generating operating parameters data may be similar to the method 77; however, the method 79 uses the operating parameter data to calculate an efficiency score and identify shutdown conditions or other actions to be taken in response to the efficiency score. For example, the efficiency score is a second order parameter and is a calculation based on multiple fuel operating parameters selected from fuel temperature, fuel pressure, fuel flow, and time. The efficiency score is then compared to an efficiency score shutdown limit. If the calculated efficiency score exceeds the limit, the method 79 initiates the shutdown event as described above. As an example, the efficiency score is the product of a safety score multiplied by one or more of a temperature score, a pressure score, a flow rate score, a tank level score, or the sum of two or more of these scores. For instance, the efficiency score is as shown in Equation I below.

$$\text{Efficiency Score} = \text{Safety Score} \times (\text{Temperature Score} + \text{Pressure Score} + \text{Flow Rate Score} + \text{Tank Level Score}).\quad\text{Equation I:}$$

In one example, the safety score is a product of a safety factor and logic values of one or zero for each of the temperature score, the pressure score, the flow rate score, and the tank level score. Thus, if any of the temperature score, the pressure score, the flow rate score, or the tank level score fails, resulting in a logic value of zero, the efficiency score will be zero. In response to an efficiency score of zero, the method 79 initiates the shutdown event as described above. The logic values are assigned according to whether the given parameter is within a predetermined minimum/maximum range. If the parameter is within the range, the logic value is one and if the parameter is outside of the range, the value is zero. As an example, the safety score may be determined by:

Safety Score=(Safety Check Positive Response/Total Safety Checks)*(IF(Temperature Reading between MIN LIMIT and MAX LIMIT) THEN1ELSE0))*(IF(Pressure Reading between MIN LIMIT and MAX LIMIT) THEN1ELSE0))*(IF(Flow Rate Reading between MIN LIMIT and MAX LIMIT) THEN1ELSE0))*(IF(Tank Inventory Reading between MIN LIMIT and MAX LIMIT) THEN1ELSE0)), wherein Temperature Score=(((Temperature Reading−Min Limit)/Temperature Reading)+((Max Limit+Temperature Reading)/Temperature Reading)))/2, Pressure Score=(((Pressure Reading−Min Limit)/Pressure Reading)+((Max Limit+Pressure Reading)/Pressure Reading)))/2, Flow Rate Score=(((Flow Rate Reading−Min Limit)/Flow Rate Reading)+((Max Limit+Flow Rate Reading)/Flow Rate Reading)))/2, and Tank Level Score=(((Tank Level Reading−Min Limit)/Tank Level Reading)+((Max Limit+Tank Level Reading)/Tank Level Reading)))/2.

In one example, the safety factor includes a calculation based on safety checks of a mobile distribution station 20. For instance, the safety factor is the quotient of positive or passing safety checks divided by the total number of safety check made. A safety check may involve periodic validation of multiple parameters or conditions on the site of a station 20 and/or in the station 20. As examples, the safety check may include validation that electrical power supply is fully functional (e.g., a generator), validation of oil levels (e.g., in a generator), validation of whether there are any work obstructions at the site, etc. Thus, each safety check may involve validation of a set of parameters and conditions. If validation passes, the safety check is positive and if validation does not pass the safety check is negative. As an example, if 5 safety checks are conducted for a station 20 and four of the checks pass and one does not pass, the safety factor is equal to four divided by five, or 0.8.

The method 79 also uses the efficiency score to actively intelligently auto-manage operation of one or more of the mobile distribution stations 20. For example, the efficiency score is compared in the method 79 with an efficiency score threshold limit or efficiency score range. If the efficiency score is outside of the limit or range, the method 79 initiates an adjustment event to adjust settings of the operating parameters of the mobile distribution station 20. For example, pumping rate or power may be changed to increase or decrease fuel pressure. In further examples in the table below, preset actions are taken in response to efficiency scores within preset ranges.

| Efficiency Score | Action |
| --- | --- |
| <=1 | SHUTDOWN |
| >1 AND <=2 | ALERT |
| >2 AND <=3 | ADJUST SETTINGS |
| >3 AND <=4 | NO ACTION |

The adjustment event may include forming an adjustment instruction message and publishing or sending the adjustment instruction message to the mobile distribution station 20 via the IoT Gateway. Upon receiving the adjustment instruction message the controller 52 of the mobile distribution station 20 validates and executes the message. The message constitutes a control action to change one or more of the operating parameters to move the efficiency score within the limit or range. As an example, pumping rate is changed to change fuel pressure. Other parameters may additionally or alternatively be adjusted to change the fuel efficiency score, such as but not limited to, fuel tank upper and lower thresholds, sequence of opening/closing control valves 44, and number of control valves 44 that may be open at one time. Thus, once implemented, the method 79 can serve to auto-adjust operation of one or more of the mobile distribution stations 20, without human intervention, to achieve enhanced or optimize fuel distribution.

In one example, a rate of fuel consumption of one or more pieces of the equipment may be calculated, and the upper and/or lower fuel level threshold settings are changed in response to the calculated rate of fuel consumption. For instance, if consumption is lower or higher than a given fuel level threshold setting warrants, the fuel level threshold setting is responsively auto-adjusted up or down for more efficient operation. For a low consumption rate, there may be a downward adjustment of the lower fuel level threshold, since there is lower likelihood that the low consumption rate will lead to a fully empty condition in the equipment. Similarly, for a high consumption rate, there may be an upward adjustment of the lower fuel level threshold, since there is higher likelihood that the high consumption rate will lead to a fully empty condition in the equipment. Thus, the mobile distribution station 20 can be operated more efficiently and safely by distributing fuel at proper times to ensure filling the equipment with desired safety margins.

Similar to the shutdown instruction message described above, the method 79 may include a timing feature that waits for confirmation of adjustment. Once adjustment is confirmed by the controller 52, confirmation of adjustment is published or sent via the Iot Gateway to the IoT Platform for subsequent issuance of an alert. If there is no confirmation of adjustment by a maximum preset time threshold, a non-confirmation of adjustment is published or sent for subsequent issuance of an alert. In further examples, the method 79 may exclude use of the efficiency score for purposes of shutdown or for purposes of intelligent auto-management. That is, the method 79 may employ the efficiency score for only one or the other of shutdown or intelligent auto-management.

Additionally or alternatively, the system 69 with one or more mobile distribution stations 20 and one or more servers may be used for centralized, intelligent auto-filling. For example, fuel levels may be tracked in real-time or near real-time. When a fuel level associated with one of the stations 20 reaches the lower threshold, described above, an instruction may be sent via the system 69 to active the pump 30 and open the appropriate control valve 44. Moreover, the system 69 can ensure that there is minimal or zero delay time from the time of identifying the low threshold to the time that filling begins. Thus, at least a portion of the functionality of the controllers 52 may be remotely and centrally based in the server of the system 69.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A distribution station comprising:
   a mobile trailer;
   a pump on the mobile trailer;
   first and second manifolds on the mobile trailer and fluidly connected with the pump;
   a plurality of reels on the mobile trailer;
   a plurality of hoses connected, respectively, with the reels, wherein a portion of the reels are connected with the first manifold and another portion of the reels are connected with the second manifold;
   a plurality of valves on the mobile trailer, each of the valves situated between one of the first or second manifolds and a respective different one of the hoses; and
   a plurality of fluid level sensors, each of the fluid level sensors being associated with a respective different one of the hoses,
      wherein the reels are arranged on first and second opposed sides in the mobile trailer, with an aisle walkway down the middle of the mobile trailer,
      wherein the aisle walkway has an aisle width and the mobile trailer has a trailer width, and a ratio of the trailer width to the aisle width is no greater than 5, and
      wherein the reels have a reel diameter, and the aisle width is greater than the reel diameter by a factor of at least 1.3.

2. The distribution station as recited in claim 1, wherein the reels on each of the first and second opposed sides are arranged in upper and lower rows of reels.

3. The distribution station as recited in claim 2, wherein a ratio of a number of reels in the upper row to a number of reels in the lower row is 1:1.

4. The distribution station as recited in claim 2, further comprising first and second support racks on which the reels are supported, the first support rack arranged on the first side and the second support rack arranged on the second side.

5. The distribution station as recited in claim 1, wherein the trailer width is no greater than about 96 inches.

6. The distribution station as recited in claim 1, wherein the mobile trailer includes trailer end wall that has an outside door, an inside wall that defines first and second compartments in the mobile trailer, the outside door opening into the first compartment, and at least the manifolds and the reels are in the first compartment.

7. The distribution station as recited in claim 6, wherein the inside wall includes an inside door providing access between the first compartment and the second compartment, the aisle walkway extending from the outside door to the inside door.

8. The distribution station as recited in claim 6, further comprising a controller in the second compartment, the controller configured to operate the valves.

9. The distribution station as recited in claim 8, wherein the second compartment is insulated with a fire resistant or retardant material.

10. The distribution station as recited in claim 1, wherein the aisle width is greater than the reel diameter by a factor of at least 1.5.

11. The distribution station as recited in claim 1, wherein the ratio of the trailer width to the aisle width is greater than 2.

12. The distribution station as recited in claim 11, wherein the ratio of the trailer width to the aisle width is equal to or less than 4.

13. The distribution station as recited in claim 1, further comprising a floor pan in the mobile trailer.

14. A distribution station comprising:
   a mobile trailer;
   a pump on the mobile trailer;
   at least one manifold on the mobile trailer and fluidly connected with the pump;
   a plurality of reels on the mobile trailer;

a plurality of hoses connected, respectively, with the reels, wherein the reels are connected with the at least one manifold;

a plurality of valves on the mobile trailer, each of the valves situated between the at least one manifold and a respective different one of the hoses; and a plurality of fluid level sensors, each of the fluid level sensors being associated with a respective different one of the hoses, wherein the mobile trailer includes first and second trailer side walls, and a first group of the hoses are deployable from the first trailer side wall and a second group of the hoses are deployable from the second trailer side wall.

15. The distribution station as recited in claim 14, wherein the reels are arranged on first and second opposed sides in the mobile trailer such that there is an aisle walkway down the middle of the mobile trailer.

16. The distribution station as recited in claim 15, wherein the reels on each of the first and second opposed sides are arranged in upper and lower rows of reels.

17. The distribution station as recited in claim 16, wherein the aisle walkway has an aisle width and the reels have a reel diameter, and the aisle width is greater than the reel diameter by a factor of at least 1.3.

18. The distribution station as recited in claim 17, wherein the mobile trailer has a trailer width of no greater than about 96 inches.

19. The distribution station as recited in claim 17, further comprising a floor pan in the mobile trailer.

\* \* \* \* \*